United States Patent
Hayakawa et al.

(10) Patent No.: US 11,661,065 B2
(45) Date of Patent: May 30, 2023

(54) VEHICLE TRAVEL CONTROL METHOD AND VEHICLE TRAVEL CONTROL APPARATUS

(71) Applicant: Nissan Motor Co., Ltd., Yokohama (JP)

(72) Inventors: Yasuhisa Hayakawa, Kanagawa (JP); Takahiko Oki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 347 days.

(21) Appl. No.: 17/269,176

(22) PCT Filed: Sep. 7, 2018

(86) PCT No.: PCT/JP2018/033226
§ 371 (c)(1),
(2) Date: Feb. 17, 2021

(87) PCT Pub. No.: WO2020/049721
PCT Pub. Date: Mar. 12, 2020

(65) Prior Publication Data
US 2021/0276561 A1    Sep. 9, 2021

(51) Int. Cl.
*B60W 30/08*    (2012.01)
*B60W 30/095*    (2012.01)
(Continued)

(52) U.S. Cl.
CPC ... *B60W 30/18163* (2013.01); *B62D 15/0255* (2013.01); *B60W 2552/20* (2020.02);
(Continued)

(58) Field of Classification Search
CPC ....... B60W 30/18163; B60W 2552/20; B60W 2554/4041; B60W 2554/801;
(Continued)

(56) References Cited

U.S. PATENT DOCUMENTS

| 6,163,093 A | 12/2000 | Shimizu et al. |
| 2015/0103159 A1 | 4/2015 | Shashua et al. |

(Continued)

FOREIGN PATENT DOCUMENTS

| CN | 106030609 A | 10/2016 |
| DE | 10 2011 016771 A1 | 10/2012 |

(Continued)

*Primary Examiner* — Abby Y Lin
*Assistant Examiner* — Hossam M Abd El Latif
(74) *Attorney, Agent, or Firm* — Young Basile Hanlon & MacFarlane, P.C.

(57) ABSTRACT

When executing the autonomous lane change control of lane change of the subject vehicle from the subject vehicle lane in which the subject vehicle travels to adjacent lane, the autonomous lane change control is executed so as to accelerate the lateral speed of the subject vehicle in the subject vehicle lane and thereafter decelerate the lateral speed in the subject vehicle lane. As a result, it takes longer for the driver of the following vehicle to confirm the lateral movement of the preceding subject vehicle during the lane change of the subject vehicle from the start of the lane change than a lane change in which the lateral speed is decelerated in the adjacent lane. Therefore, it becomes easier to recognize the lane change.

11 Claims, 25 Drawing Sheets

(51) Int. Cl.
*B60W 30/10* (2006.01)
*B60W 30/18* (2012.01)
*B60W 60/00* (2020.01)
*B62D 15/02* (2006.01)
*B62D 6/00* (2006.01)
*G08G 1/16* (2006.01)

(52) U.S. Cl.
CPC ............... *B60W 2554/4041* (2020.02); *B60W 2554/801* (2020.02); *B60W 2554/802* (2020.02); *B60W 2554/804* (2020.02); *B60W 2555/20* (2020.02); *B60W 2720/12* (2013.01)

(58) Field of Classification Search
CPC ..... B60W 2554/802; B60W 2554/804; B60W 2555/20; B60W 2720/12; B60W 30/08; B60W 30/095; B60W 30/0956; B60W 60/001; B60W 30/10; B62D 15/0255; B62D 6/00; B62D 15/02; G08G 1/16
USPC .......................................................... 701/26
See application file for complete search history.

(56) References Cited

U.S. PATENT DOCUMENTS

| | | |
|---|---|---|
| 2015/0151725 A1 | 6/2015 | Clarke et al. |
| 2015/0151742 A1 | 6/2015 | Clarke et al. |
| 2015/0151751 A1 | 6/2015 | Clarke et al. |
| 2015/0151753 A1 | 6/2015 | Clarke et al. |
| 2015/0153735 A1 | 6/2015 | Clarke et al. |
| 2015/0210274 A1 | 7/2015 | Clarke et al. |
| 2015/0210275 A1 | 7/2015 | Huberman |
| 2015/0210276 A1 | 7/2015 | Ben Shalom et al. |
| 2015/0210277 A1 | 7/2015 | Ben Shalom |
| 2015/0210278 A1 | 7/2015 | Ben Shalom et al. |
| 2015/0210312 A1 | 7/2015 | Stein et al. |
| 2015/0367850 A1 | 12/2015 | Clarke et al. |
| 2016/0052514 A1 | 2/2016 | Clarke et al. |
| 2016/0167650 A1 | 6/2016 | Clarke et al. |
| 2016/0167704 A1 | 6/2016 | Stein et al. |
| 2016/0225261 A1 | 8/2016 | Matsumoto |
| 2016/0229410 A1 | 8/2016 | Clarke et al. |
| 2016/0283807 A1 | 9/2016 | Ben Shalom et al. |
| 2016/0306361 A1 | 10/2016 | Ben Shalom et al. |
| 2016/0318511 A1* | 11/2016 | Rangwala ........... B60W 30/095 |
| 2016/0347322 A1 | 12/2016 | Clarke et al. |
| 2017/0151982 A1 | 6/2017 | Fujii et al. |
| 2018/0046193 A1* | 2/2018 | Takada ................ B60W 30/095 |
| 2018/0174462 A1* | 6/2018 | Um .................... B60W 30/0953 |
| 2018/0251129 A1* | 9/2018 | Ji ..................... B60W 30/0953 |
| 2018/0268226 A1 | 9/2018 | Shashua et al. |
| 2019/0248372 A1 | 8/2019 | Clarke et al. |
| 2019/0294179 A1 | 9/2019 | Stein et al. |
| 2020/0094839 A1 | 3/2020 | Clarke et al. |
| 2020/0108834 A1 | 4/2020 | Clarke et al. |
| 2020/0125863 A1 | 4/2020 | Shashua et al. |
| 2020/0225681 A1 | 7/2020 | Stein et al. |
| 2020/0331477 A1 | 10/2020 | Clarke et al. |
| 2021/0146927 A1 | 5/2021 | Clarke et al. |
| 2021/0146928 A1 | 5/2021 | Clarke et al. |
| 2021/0146929 A1 | 5/2021 | Clarke et al. |

FOREIGN PATENT DOCUMENTS

| | | |
|---|---|---|
| JP | 2000-278908 A | 10/2000 |
| JP | 2004-034751 A | 2/2004 |
| JP | 2006-076568 A | 3/2006 |
| JP | 2009-184675 A | 8/2009 |
| JP | 2017-074806 A | 4/2017 |
| JP | 2017-100534 A | 6/2017 |

* cited by examiner

FIG. 2

| Travel scene | Determination condition | Direction of changing lanes | Necessity level of changing lanes | Time limit |
|---|---|---|---|---|
| Scene of catching up with preceding vehicle | "Preceding vehicle exists ahead" and "Vehicle speed of preceding vehicle < Set vehicle speed of subject vehicle" and "Subject vehicle will reach preceding vehicle within predetermined time" and "Direction of changing lanes is not under lane change prohibition condition" | Toward overtaking lane side | X 1 | Time to reach preceding vehicle − α |
| Scene of approaching tollgate | "Time to reach tollgate located ahead is less than 60 seconds" and "Direction of changing lanes is not under lane change prohibition condition" | Toward empty toll gate booth side | X 2 | Time to reach tollgate − α |
| Scene of approaching merging point | "Time to reach merging point located ahead is less than predetermined time" and "Direction of changing lanes is not under lane change prohibition condition" | Toward opposite side to merging lane | X 3 | Time to reach merging point − α |
| Obstruction scene of subject vehicle lane | "Travel lane of subject vehicle will disappear within predetermined distance" and "Direction of changing lanes is not under lane change prohibition condition" | Toward unobstructed lane side | X 4 | Time to reach obstructed point − α |
| Scene of avoiding object on road | "Pedestrian, bicycle, motorcycle, or fallen object on road exists ahead" and "Direction of changing lanes is not under lane change prohibition condition" | Toward unoccupied lane side | X 5 | Time to reach object on road − α |
| Scene of being caught up by vehicle from behind | "Following vehicle exists in travel lane of subject vehicle" and "Vehicle speed of following vehicle > Vehicle speed of subject vehicle" and "Following vehicle will reach subject vehicle within predetermined time" and "Direction of changing lanes is not under lane change prohibition condition" | Toward opposite side to overtaking lane | X 6 | Time for following vehicle to reach subject vehicle − α |
| Emergency evacuation scene | "Onboard equipment is not operated within predetermined time" and "Driver is determined to be incapable of driving" and "Direction of changing lanes is not under lane change prohibition condition" | Toward road shoulder side | X 7 | None |
| Scene of lane transfer toward destination | "Destination is set" and "Time to reach lane change point is within predetermined time" and "Direction of changing lanes is not under lane change prohibition condition" | Toward lane side for heading to destination | X 8 (X 1 < X 8) | Time to reach lane change point − α |
| Scene of heading to SA/PA | "Time to reach SA/PA is within predetermined time" "Elapsed time after previous rest is predetermined time or more" and "Direction of changing lanes is not under lane change prohibition condition" | Toward lane side near SA/PA | X 9 | Time to reach SA/PA − α |

FIG. 3C
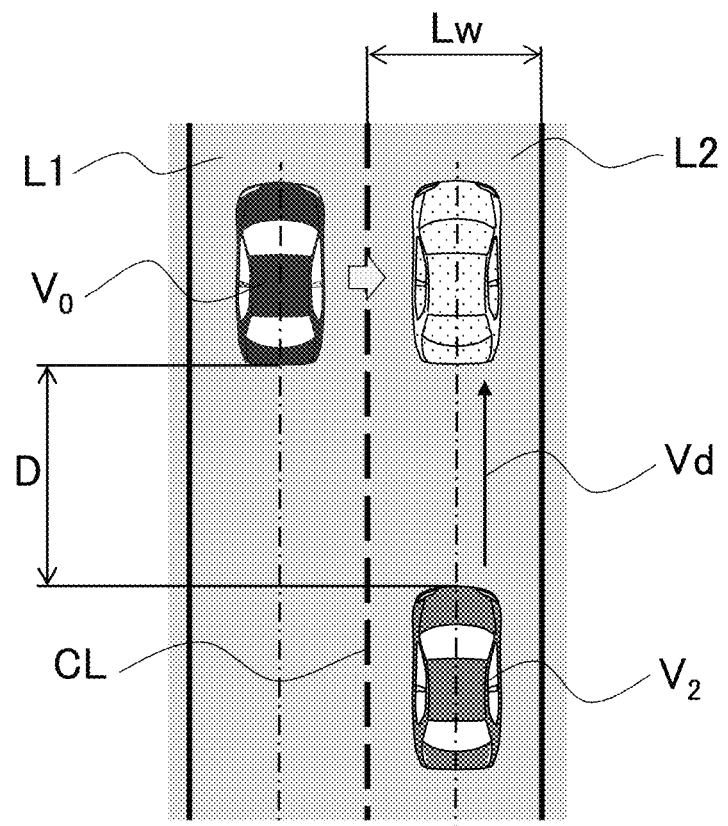
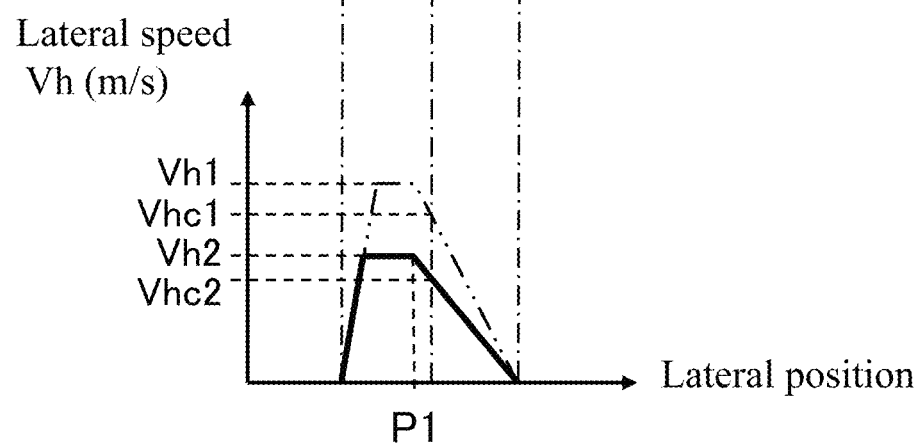

FIG. 4

| Travel information | Coefficient |
|---|---|
| Inter-vehicle distance | 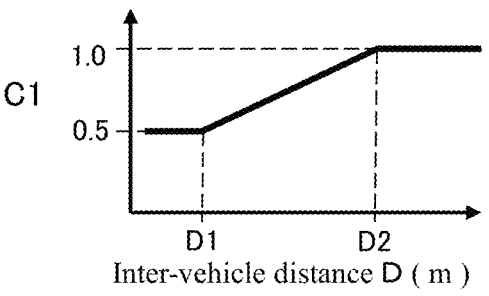 C1 vs Inter-vehicle distance D (m), rising from 0.5 at D1 to 1.0 at D2 |
| Relative speed | 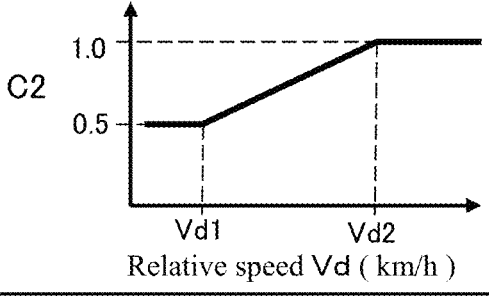 C2 vs Relative speed Vd (km/h), rising from 0.5 at Vd1 to 1.0 at Vd2 |
| Road width of adjacent lane | 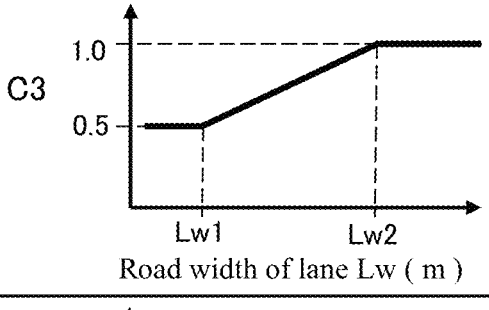 C3 vs Road width of lane Lw (m), rising from 0.5 at Lw1 to 1.0 at Lw2 |
| Radius of adjacent lane | 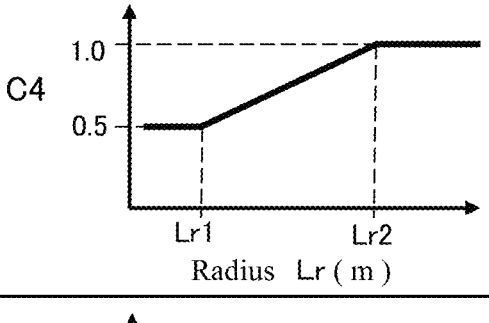 C4 vs Radius Lr (m), rising from 0.5 at Lr1 to 1.0 at Lr2 |
| Amount of rainfall | 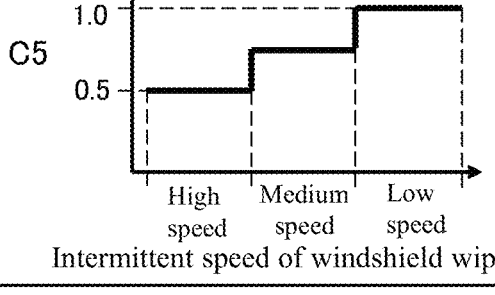 C5 vs Intermittent speed of windshield wiper (High speed, Medium speed, Low speed), stepping from 0.5 to 1.0 |

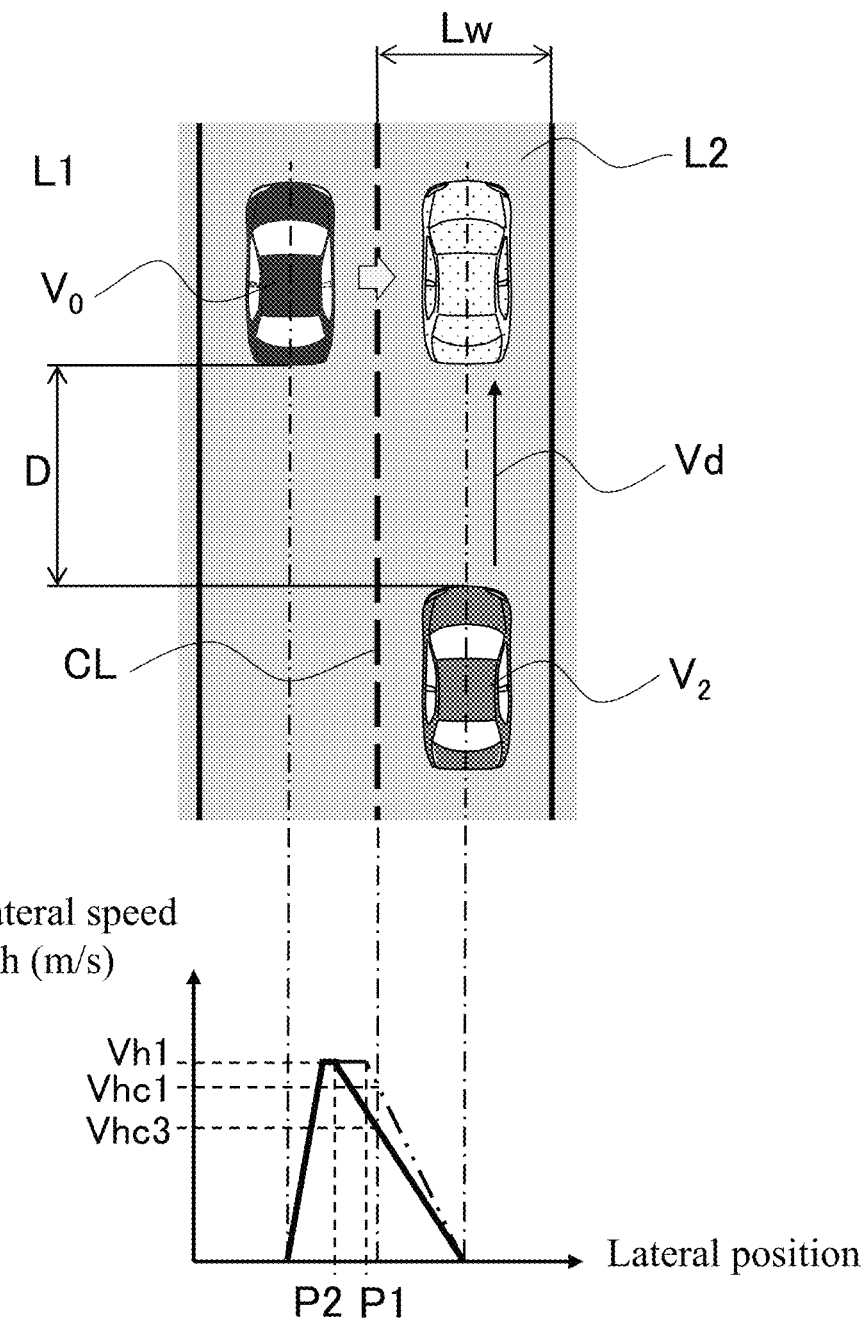

VEHICLE TRAVEL CONTROL METHOD AND VEHICLE TRAVEL CONTROL APPARATUS

TECHNICAL FIELD

The present invention relates to a travel control method for a vehicle and a travel control apparatus for a vehicle that include autonomous control of a lane change.

BACKGROUND

There is known a technique for autonomous lane change of a vehicle by decreasing a predetermined lateral acceleration or a predetermined lateral speed when an object is detected in a lane or near lane to which a vehicle travels to change a lane (JP2017-100534 A).

SUMMARY

In the above prior art, a lateral acceleration or a lateral speed is reduced to eliminate any discomfort to an occupant upon lane change. Therefore, in the prior art, it does not consider executing lane change so that following vehicles and the like can be easily confirmed. Consequently, depending on how the vehicle moves during lane change, it may be delayed for the following vehicle to notice the lane change of the preceding vehicle.

A problem to be solved by the present invention is to provide a vehicle travel control method and a vehicle travel control apparatus capable of making a lane change so that the vehicle can be easily recognized by a following vehicle.

The present invention solves the above problem by accelerating the lateral speed of the subject vehicle within a subject vehicle lane, and thereafter decelerating the lateral speed within the subject vehicle lane to operate a steering actuator so as to execute an autonomous lane change to an adjacent lane.

In the present invention, the lateral speed of the subject vehicle is increased within the subject vehicle lane and thereafter the lateral speed is decreased within the subject vehicle lane before changing to the adjacent lane, in response to a lane change wherein the lateral speed is decreased within the adjacent lane. Therefore, it is easier for a driver of a following vehicle to recognize the lane change of the preceding subject vehicle because it takes longer for the driver to confirm the lateral direction movement of the preceding subject vehicle during the lane change from the beginning.

BRIEF DESCRIPTION OF THE DRAWINGS

FIG. 2 is a diagram illustrating an example of a scene determination table used for determination of a driving scene;

FIG. 3C is a plan view illustrating a scene of a lane change according to one or more embodiments of the present invention, and a graph illustrating a state in which the second target lateral speed is changed in the second lateral speed control according to the first embodiment of the travel control apparatus for a vehicle according to the present invention;

FIG. 4 is a diagram illustrating a lateral speed setting table used in the second lateral speed control according to the first embodiment of the travel control apparatus for a vehicle according to the present embodiment;

FIG. 5 is a plan view illustrating a scene of a lane change according to one or more embodiments of the present invention and a graph illustrating a second lateral speed control according to the second embodiment of the travel control apparatus for a vehicle according to the present invention;

DETAILED DESCRIPTION

Figure 1:
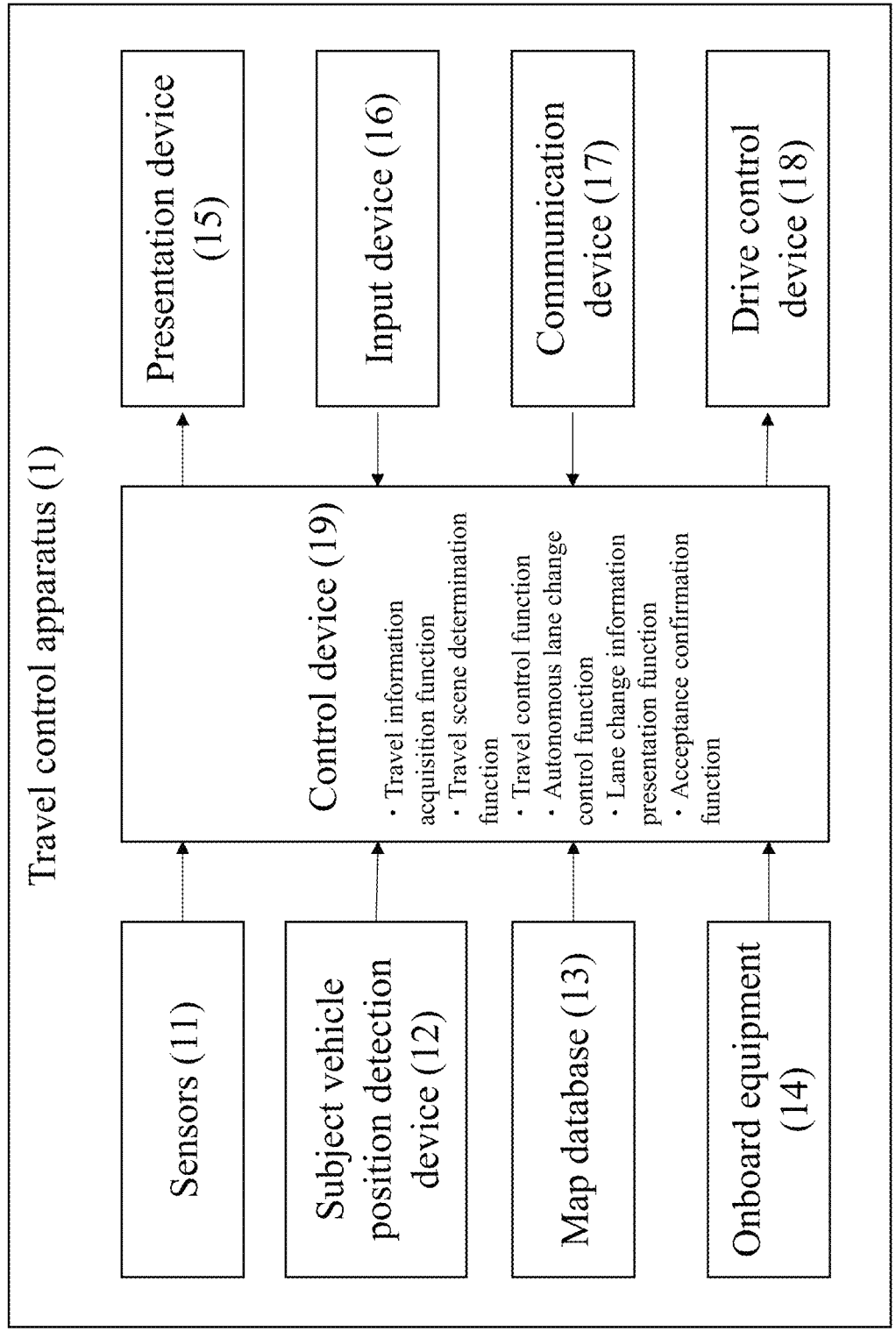
FIG. 1 is a block diagram illustrating an embodiment of the travel control apparatus for a vehicle according to the present invention.

FIG. 1 is a block diagram illustrating the configuration of a travel control apparatus 1 for a vehicle according to one or more embodiments of the present invention. The travel control apparatus 1 for a vehicle according to one or more embodiments of the present invention represents an embodiment of carrying out the travel control method for a vehicle according to the present invention. As illustrated in FIG. 1, the travel control apparatus 1 for a vehicle according to one or more embodiments of the present invention includes sensors 11, a subject vehicle position detection device 12, a map database 13, onboard equipment 14, a presentation device 15, an input device 16, a communication device 17, a drive control device 18, and a control device 19. These devices are connected to one another, for example, via a controller area network (CAN) or other onboard LAN for mutually exchanging information.

The sensors 11 detect a traveling state of the subject vehicle. Examples of the sensors 11 include a front camera that captures images ahead of the subject vehicle, a rear camera that captures images behind the subject vehicle, a front radar that detects obstacles ahead of the subject vehicle, a rear radar that detects obstacles behind the subject vehicle, side radars that detect obstacles existing on the right and left sides of the subject vehicle, a vehicle speed sensor that detects the vehicle speed of the subject vehicle, and an onboard camera that captures images of the driver. The sensors 11 may be represented by one of the above-described various sensors or may also be configured as a combination of two or more sensors. The detection results of the sensors 11 are output to the control device 19 at predetermined time intervals.

The subject vehicle position detection device 12 is composed of a GPS unit, a gyro-sensor, a vehicle speed sensor, and other components. The subject vehicle position detection device 12 detects radio waves transmitted from a plurality of communication satellites using the GPS unit to periodically acquire positional information of a target vehicle (subject vehicle) and detects the current position of the target vehicle on the basis of the acquired positional information of the target vehicle, angle variation information acquired from the gyro-sensor, and the vehicle speed acquired from the vehicle speed sensor. The positional information of the target vehicle detected by the subject vehicle position detection device 12 is output to the control device 19 at predetermined time intervals.

A map database 13 stores map information including location information of various facilities and particular points. Specifically, location information such as junction points, branch points, toll gates, positions at which lane number is reduced, service areas (SA)/parking areas (PA), and the like is stored together with map information. The map information includes information on the road, such as the road type, the road width, the number of lanes, the road radius, the presence or absence of the exclusive use lane for right-turn or left-turn and the number of the exclusive use lanes, and the speed limit. Map information stored in the map database can be referenced by the control device 19.

The onboard equipment 14 includes various modules equipped in the vehicle and is operated by the driver. Examples of such onboard equipment include a steering, an accelerator pedal, a brake pedal, a navigation device, an audio device, an air conditioner, a hands-free switch, power windows, wipers, lights, flashers, a horn, and specific switches. When the driver operates the onboard equipment 14, its information is output to the control device 19.

The presentation device 15 is, for example, a device such as a display of a navigation device, a display incorporated in a rearview mirror, a display incorporated in a meter unit, a head-up display projected on a windshield, a speaker of an audio device, or a seat device with embedded vibrating bodies. The presentation device 15 informs the driver of presentation information and lane change information, which will be described later, under the control by the control device 19.

The input device 16 is, for example, a device such as a dial switch or a touch panel disposed on a display screen with which the driver can input information by the manual operation or a microphone with which the driver can input information by the voice. In one or more embodiments of the present invention, the driver can operate the input device 16 thereby to input response information in response to the presentation information which is presented by the presentation device 15. For example, in one or more embodiments of the present invention, switches of flashers or other onboard equipment 14 can also be used as the input device 16. More specifically, the input device 16 may be configured such that the driver turns on the switch of a flasher thereby to input acceptance or permission for changing lanes in response to a query as to whether or not the control device 19 autonomously performs changing lanes. The response information which is input via the input device 16 is output to the control device 19.

The communication device 17 performs communication with communication equipment located outside the subject vehicle. For example, the communication device 17 performs vehicle-to-vehicle communication with another vehicle, performs road-to-vehicle communication with equipment provided at a road shoulder, or performs wireless communication with an information server provided outside the vehicle and can thereby acquire various information items from the external equipment. The information acquired by the communication device 17 is output to the control device 19.

The drive control device 18 controls travel of the subject vehicle. For example, when the subject vehicle performs follow-up travel control to follow a preceding vehicle, the drive control device 18 controls the operation of a drive mechanism (which includes the operation of an internal-combustion engine in the case of an engine car and the operation of an electric motor for travel in the case of an electric car and further includes the torque distribution for an internal-combustion engine and an electric motor for travel in the case of a hybrid car) and the braking operation to achieve the acceleration, deceleration, and vehicle speed so that the distance between the subject vehicle and the preceding vehicle is maintained at a constant distance. Additionally or alternatively, when the subject vehicle performs lane keeping control of detecting lane marks of a lane in which the subject vehicle travels (also referred to as a "subject vehicle lane," hereinafter) and controlling the traveling position of the subject vehicle in the road width direction so that the subject vehicle travels in the subject vehicle lane, or when the subject vehicle performs autonomous lane change control such as overtaking of a preceding vehicle or change of the traveling direction, or when the subject vehicle performs travel control of turning right or left at an intersection or the like, the drive control device 18 executes the steering control of the subject vehicle by controlling the operation of the steering actuator in addition to the operation of the drive mechanism and the braking operation for achieving the acceleration, deceleration, and vehicle speed. The drive control device 18 controls travel of the subject vehicle in accordance with commands from the control device 19, which will be described below. Any of other well-known methods can also be used as the travel control method executed by the drive control device 18.

The control device 19 is composed of a read only memory (ROM) that stores programs for controlling travel of the subject vehicle, a central processing unit (CPU) that executes the programs stored in the ROM, and a random access memory (RAM) that serves as an accessible storage device. As substitute for or in addition to the CPU, a micro processing unit (MPU), a digital signal processor (DSP), an application specific integrated circuit (ASIC), a field programmable gate array (FPGA), or the like can also be used as the operation circuit.

The control device 19 executes the programs stored in the ROM using the CPU thereby to achieve a travel information acquisition function of acquiring information regarding a traveling state of the subject vehicle, a travel scene determination function of determining a travel scene of the subject vehicle, a travel control function of controlling travel of the subject vehicle, an autonomous lane change control function of determining whether or not changing lanes is possible and controlling the changing lanes, a lane change information presentation function of presenting the driver with lane change information regarding the travel operation of the subject vehicle executed by the autonomous lane change control, and an acceptance confirmation function of confirming whether or not the driver accepts the changing lanes in response to the presented lane change information. These functions of the control device 19 will be described below.

The travel information acquisition function of the control device 19 is a function of acquiring the travel information regarding the traveling state of the subject vehicle. For example, the control device 19 uses the travel information acquisition function to acquire as the travel information the external image information around the vehicle captured by the front camera and rear camera included in the sensors 11 and/or the detection results by the front radar, rear radar, and side radars included in the sensors 11. Additionally or alternatively, the control device 19 uses the travel information acquisition function to acquire as the travel information the vehicle speed information of the subject vehicle detected by the vehicle speed sensor included in the sensors 11 and/or the image information of the driver's face captured by the onboard camera included in the sensors 11.

In addition, the control device 19 uses the travel information acquisition function to acquire information of a current position of the subject vehicle as the travel information from the subject vehicle position detection device 12. And, the control device 19 uses the travel information acquisition function to acquire position information such as the junction points, the branch points, toll gates, the positions at which lane number is reduced, the service areas (SA)/the parking areas (PA), and the like from the map database 13 as the travel information. And, the control device 19 uses the travel information acquisition function to acquire information such as the road type, the road width, the number of lanes, the road radius, the presence or absence of the exclusive use lane for right-turn or left-turn and the number of the exclusive use lanes, and the speed limit from the map database 13 as the travel information. And, the control device 19 uses the travel information acquisition function to acquire operation information of onboard equipment 14 by a driver, for example, an intermittent speed of a windshield wiper as the travel information from the onboard equipment 14.

The travel scene determination function of the control device 19 is a function of referring to a scene determination table stored in the ROM of the control device 19 to determine the travel scene in which the subject vehicle is traveling. FIG. 2 is a diagram illustrating an example of the scene determination table used for determination of the travel scene. As illustrated in FIG. 2, the scene determination table stores travel scenes suitable for changing lanes and the determination condition for each travel scene. The control device 19 uses the travel scene determination function to refer to the scene determination table illustrated in FIG. 2 to determine whether or not the travel scene of the subject vehicle is the travel scene suitable for changing lanes.

For example, in the example illustrated in FIG. 2, the determination condition for a "scene of catching up with a preceding vehicle" is defined by four conditions: a condition that "a preceding vehicle exists ahead," a condition of "the vehicle speed of the preceding vehicle<the set vehicle speed of the subject vehicle," a condition of "reaching the preceding vehicle within a predetermined time," and a condition that "the direction of changing lanes is not under a lane change prohibition condition." The control device 19 uses the travel scene determination function to determine whether or not the subject vehicle satisfies the above conditions, for example, on the basis of the detection results by the front camera and/or front radar included in the sensors 11, the vehicle speed of the subject vehicle detected by the vehicle speed sensor included in the sensors 11, the positional information of the subject vehicle detected by the subject vehicle position detection device 12, etc. When the above conditions are satisfied, the control device 19 determines that the subject vehicle is in the "scene of catching up with a preceding vehicle." Likewise, for all other travel scenes registered in the scene determination table illustrated in FIG. 2, the control device 19 uses the travel scene determination function to determine whether or not each determination condition is satisfied.

Examples of the lane change prohibition condition include a condition that "the subject vehicle is traveling in a lane change prohibition area," a condition that "an obstacle exists in the direction of changing lanes," a condition that "the subject vehicle will get across a centerline (road center line)," and a condition that "the subject vehicle will enter a road shoulder or get across a road end." On a road on which emergency stop is permitted at a road shoulder or the like in an "emergency evacuation scene," the condition that "the subject vehicle will enter a road shoulder or get across a road end" may be permitted in the "emergency evacuation scene." In the scene determination table illustrated in FIG. 2, the necessity level of changing lanes, the time limit, and the direction of changing lanes will be described later.

When the travel scene of the subject vehicle corresponds to a plurality of travel scenes, the control device 19 uses the travel scene determination function to determine a travel scene having a higher necessity level of changing lanes as the travel scene of the subject vehicle. For example, it is assumed that, in the scene determination table illustrated in FIG. 2, the travel scene of the subject vehicle corresponds to a "scene of catching up with a preceding vehicle" and a "scene of lane transfer toward a destination" and the necessity level X1 of changing lanes in the "scene of catching up with a preceding vehicle" is lower than the necessity level X8 of changing lanes in the "scene of lane transfer toward a destination" (X1<X8). In this case, the control device 19 uses the travel scene determination function to determine the "scene of lane transfer toward a destination" with the higher necessity level of changing lanes as the travel scene of the subject vehicle. The "scene of lane transfer toward a destination" refers to a scene of changing lanes for transfer from a lane in which the subject vehicle is currently traveling, such as at a location before a branching point or an exit of a road with multiple lanes, to a lane in the intended branch direction or exit direction.

The travel control function of the control device 19 is a function of controlling travel of the subject vehicle. For example, the control device 19 uses the travel control function to detect lane marks of the subject vehicle lane in which the subject vehicle travels, on the basis of the detection results of the sensors 11 and perform the lane keeping control of controlling the traveling position of the subject vehicle in the road width direction so that the subject vehicle travels in the subject vehicle lane. In this case, the control device 19 uses the travel control function to allow the drive control device 18 to control the operation of the steering actuator and the like so that the subject vehicle travels at an appropriate traveling position. Additionally or alternatively, the control device 19 can also use the travel control function to perform the follow-up travel control of autonomously following a preceding vehicle with a certain distance from the preceding vehicle. When performing the follow-up travel control, the control device 19 uses the travel control function to output control signals to the drive control device 18, which controls the operation of the drive mechanism such as the engine and brake so that the subject vehicle travels with a constant distance between the subject vehicle and the preceding vehicle. In the following description, the autonomous travel control will be described as including the lane keeping control, the follow-up travel control, the right or left turn travel control, and the autonomous lane change control.

The autonomous lane change control function of the control device 19 is a function of determining whether or not to perform changing lanes, on the basis of the travel scene of the subject vehicle and/or information on obstacles existing around the subject vehicle. Additionally or alternatively, the autonomous lane change control function is a function of allowing the drive control device 18 to control the operation of the drive mechanism such as the engine and brake and the operation of the steering actuator when determining to perform changing lanes. Additionally or alternatively, the autonomous lane change control function is a function of setting the start timing of starting the autonomous lane change control on the basis of the traveling state of the subject vehicle and the state of the driver and executing the autonomous lane change control in accordance with the set start timing.

The function to control operation of the steering actuator in the autonomous lane change control function includes a function to control lateral speed of the subject vehicle. The lateral speed of a vehicle is a moving speed with respect to an axis perpendicular to the traveling direction of the vehicle. That is, the lateral speed of the vehicle is the lateral speed of the vehicle in the width direction of the traveling lane when the vehicle is traveling in the traveling lane. The control device 19 uses the autonomous lane change control function of the present embodiment automatically to switch between a first lateral speed control and a second lateral speed control according to the presence or absence of a following vehicle in an adjacent lane when executing a lane change of the subject vehicle from the subject vehicle lane to the adjacent lane.

Hereinafter, the first lateral speed control and the second lateral speed control according to the first embodiment of the present invention are described.

Figure 3A:
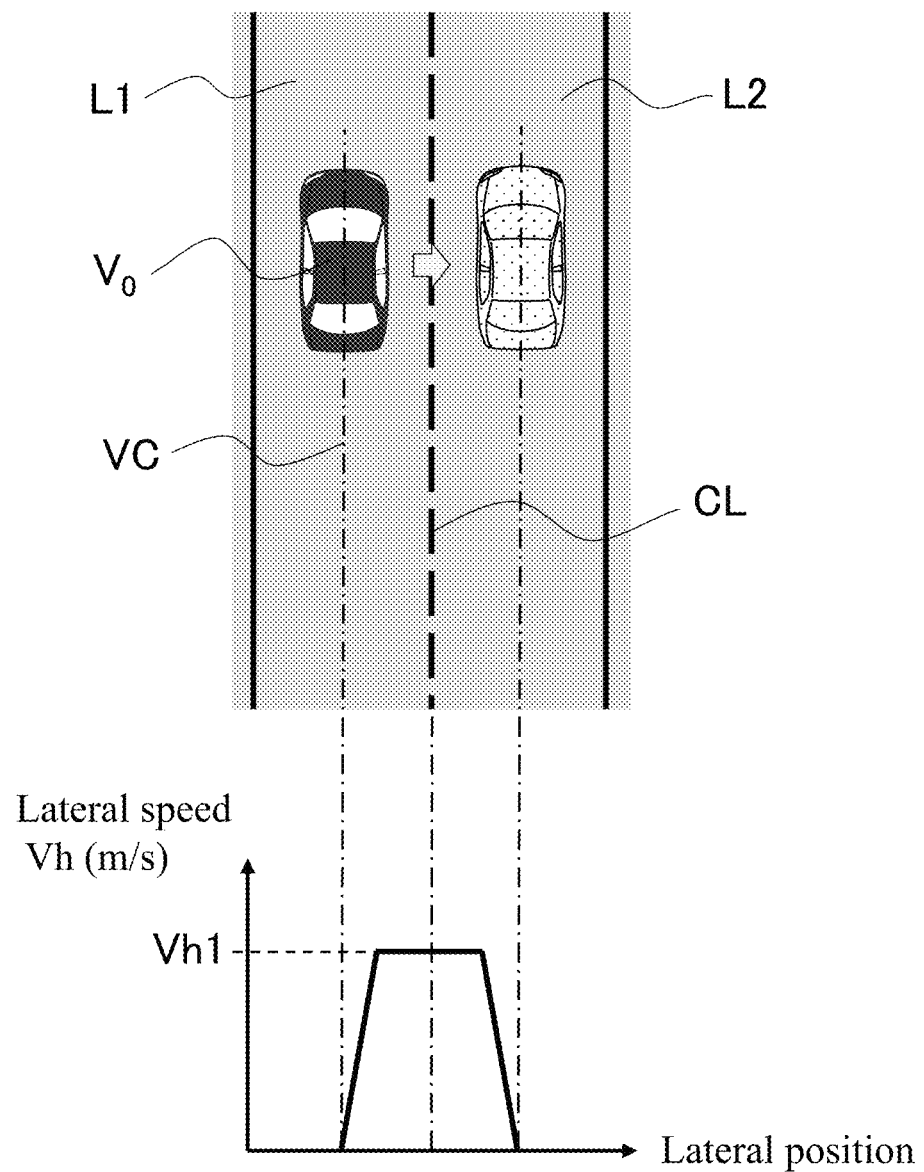
FIG. 3A is a plan view illustrating a scene of a lane change according to one or more embodiments of the present invention and a graph illustrating a first lateral speed control of the travel control apparatus for a vehicle according to one or more embodiments of the present invention.

The first lateral speed control is performed when there is no following vehicle in an adjacent lane L2. FIG. 3A shows the control content of the first lateral speed control, and FIG. 3A shows a plan view showing the travel scene upon the lane change and a graph showing the horizontal position and the lateral speed of the subject vehicle upon the lane change. The plan view of FIG. 3A shows one example of the autonomous lane change control in which a subject vehicle $V_0$ traveling on the left-side subject vehicle lane L1 performs a lane change to the right-side adjacent lane L2 in the left-side traffic having two lanes L1, L2 because there is a branch point on the road ahead. Although an illustration is omitted, when the subject vehicle $V_0$ is traveling on the right-side lane L2, there is an exit of the expressway on the front left-side and the traveling direction is changed to the exit, the subject vehicle $V_0$ needs to change lane from the present subject vehicle lane L2 to the adjacent lane L1. The same control is performed in such a case.

In the first lateral speed control, the subject vehicle $V_0$ accelerates within the subject vehicle lane L1 until lateral speed Vh (m/s) of the subject vehicle $V_0$ reaches a preset first target lateral speed Vh1, as shown in the diagram below the plan view of FIG. 3A. The subject vehicle $V_0$ changes the lane from subject vehicle lane L1 to the adjacent lane L2 while maintaining the first target lateral speed Vh1, and then decelerates until a lateral speed Vh of the subject vehicle $V_0$ becomes 0 (m/s) from the first target lateral speed Vh1 in the adjacent lane L2. That is, when the lateral speed upon subject vehicle $V_0$ exceeding the lane marks CL (hereinafter also referred to as the object lane marks) between the subject vehicle lane L1 and the adjacent lane L2 refers to a lane change lateral speed, the lane change lateral speed has the same Vh1 as the first target lateral speed in the first lateral speed control.

Here, the term "lane change lateral speed" means a lateral speed when the subject vehicle $V_0$ exceeds the object lane marks CL between the subject vehicle lane L1 and the adjacent lane L2, and the lateral speed when the center line VC of the subject vehicle $V_0$ exceeds the object lane marks CL. For example, when a lane change from the left-side lane to the right-side lane is executed, the lateral speed of an average or a peak in the period from the right front wheel treading the object lane marks CL to the left rear wheel exceeding the object lane marks CL may be set to the lane change lateral speed.

Figure 3B:
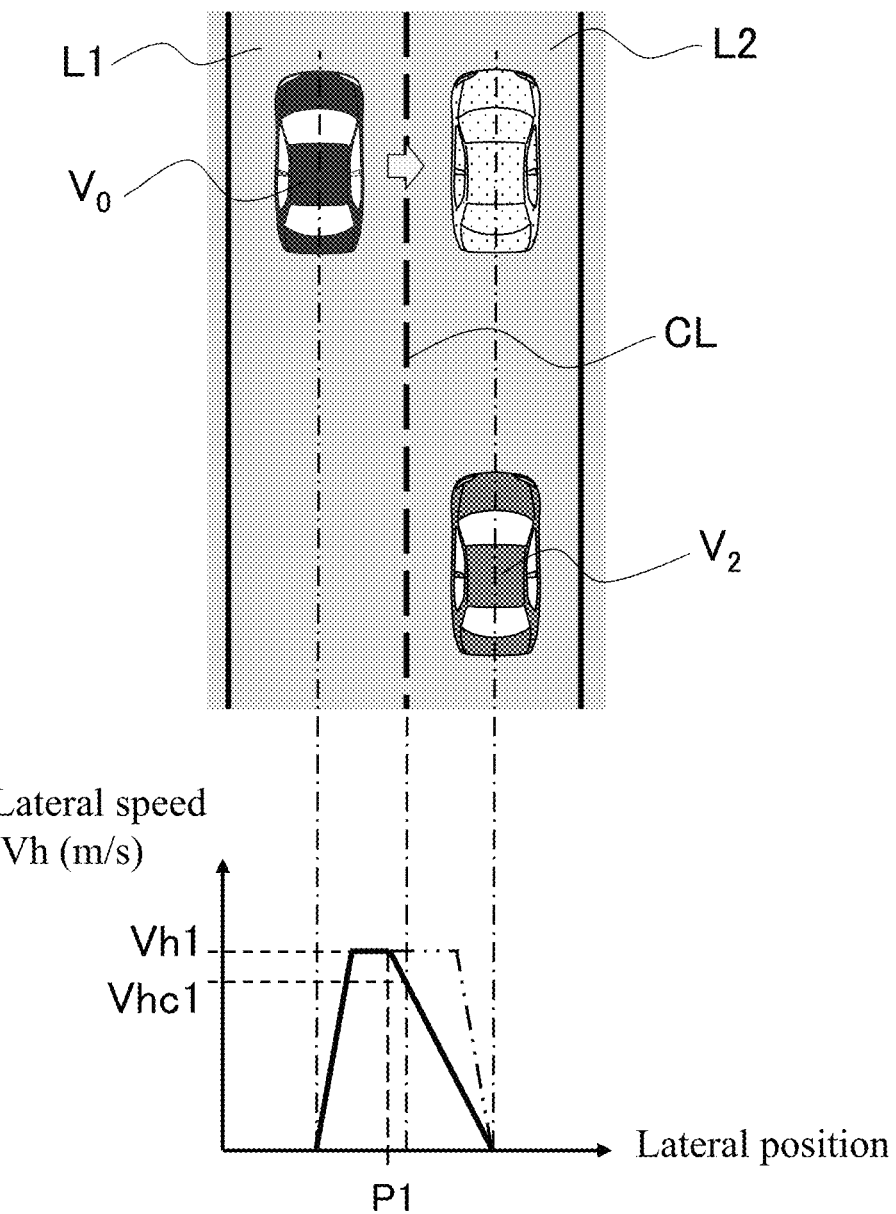
FIG. 3B is a plan view illustrating a scene of a lane change according to one or more embodiments of the present invention and a graph illustrating a second lateral speed control according to first embodiment of the travel control apparatus for a vehicle according to the present invention.

In contrast to such a first lateral speed control, a second lateral speed control is executed when there is a following vehicle $V_2$ in the adjacent lane L2 as shown in FIG. 3B, that is, when it is necessary to execute a lane change to make it easier for the driver of the following vehicle $V_2$ to confirm the lane change. FIG. 3B shows the control details of the second lateral speed control, and FIG. 3B includes a plan view showing the travel scene upon the lane change and a graph showing the lateral speed of the subject vehicle upon the lane change. The travel scene shown in a plan view of FIG. 3B, since the same as the FIG. 3A, a detailed description thereof will be omitted. In the second lateral speed control, the subject vehicle $V_0$ accelerates until the lateral speed Vh (m/s) of the subject vehicle $V_0$ reaches the preset first target lateral speed Vh1 in the subject vehicle lane L1 in such a travel scene upon the lane change. Then, the subject vehicle $V_0$ starts decelerating the lateral speed Vh at a time P1 within the same subject vehicle lane L1. The subject vehicle $V_0$ changes the traveling lane from the subject vehicle lane L1 to the adjacent lane L2 while decelerating lateral speed Vh.

According to the second lateral speed control, the subject vehicle $V_0$ starts to decelerate lateral speed Vh at a time P1 within the same subject vehicle lane L1 after accelerating lateral speed Vh (m/s) of the subject vehicle $V_0$ within the subject vehicle lane L1 until the preset first target lateral speed Vh1. Therefore, in the second lateral speed control, as in the first lateral speed control, while accelerating lateral speed within the same subject vehicle lane, prior to the first lateral speed control, the lateral speed is decelerated. This allows the second lateral speed control to slowly change the traveling lane so that the driver of the following vehicle $V_2$ can recognize the movement to start the lane change of the subject vehicle $V_0$ as the first lateral speed control. In addition, since it takes a long time to confirm the lateral movements of the subsequent lane change of the subject vehicle $V_0$, it is easier for the drivers of the following vehicle $V_2$ to recognize, for example, the approach timing to the adjacent lane due to lane change. In the second lateral speed control, since the subject vehicle $V_0$ changes the traveling lane more slowly than in the first lateral speed control, it is possible to detect and determine the situation of the adjacent lane L2 in detail by the cameras and radars of sensors 11. Therefore, the safety of autonomous lane change control is further enhanced.

The control device 19 sets the lane change lateral speed when the subject vehicle $V_0$ exceeds the object lane marks CL between the subject vehicle lane L1 and the adjacent lane L2 on the basis of the travel information by the second lateral speed control of the autonomous lane change control function. The lane change lateral speed is changed by changing the target lateral speed at which the lateral speed of the subject vehicle $V_0$ is accelerated in the subject vehicle lane L1 to the second target lateral speed Vh2 which is lower than the first target lateral speed Vh1, as shown in the graphs of FIG. 3C. As a result, the lane change lateral speed Vhc2 upon the lane change after the acceleration to the second target lateral speed Vh2 becomes lower than the lane change lateral speed Vhc1 upon the lane change after the acceleration to the first target lateral speed Vh1. Therefore, the subject vehicle $V_0$ will make the lane change more slowly.

The control device 19 sets the second target lateral speed Vh2 of the subject vehicle $V_0$ referring to lateral speed setting table shown in FIG. 4 by the second lateral speed control of the autonomous lane change control function. The lateral speed setting table is stored in the ROM of the control device 19. The lateral speed setting table stores, for each piece of travel information, the travel information used for setting the second target lateral speed Vh2 and the coefficients used for calculating the second target lateral speed Vh2. Incidentally, in FIG. 4 shows the coefficients used for the calculation of the second target lateral speed Vh2 by a graph, the lateral speed setting table may store the equations used for the calculation of the coefficients.

In setting the second target lateral speed Vh2, the travel information related to the situations wherein the lane change of the subject vehicle $V_0$ can be impacted when the following vehicle $V_2$ confirms or the safety of the lane change can be affected is used. For example, in the example shown in FIG. 4, as the travel information, "inter-vehicle distance," "relative speed," "road width of the adjacent lane," "radius of the adjacent lane," and "amount of rainfall" are registered.

The "inter-vehicle distance" shown in the lateral speed setting table of FIG. 4 is an inter-vehicle distance D(m) between the subject vehicle $V_0$ traveling in the subject vehicle lane L1 and the following vehicle $V_2$ traveling in the adjacent lane L2 as shown in FIG. 3C. The inter-vehicle distance D is acquired, for example, on the basis of image information outside the vehicle captured by the rear camera of the subject vehicle $V_0$ and a detected result by the rear radar. In the graph showing the coefficient C1 corresponding to the inter-vehicle distance D, a horizontal axis corresponds the inter-vehicle distance D of D1 to D2 (for example, 10 to 200 m) and a vertical axis corresponds the coefficient C1 of 0.5 to 1.0. The shorter the inter-vehicle distance D is, the smaller the coefficient C1 is. The control device 19 can acquire the coefficient C1 corresponding to the inter-vehicle distance D by detecting the inter-vehicle distance D and referring to this graph.

The inter-vehicle distance D is used to set the second target lateral speed Vh2 because the shorter inter-vehicle distance D, the closer lane change will be performed to the following vehicle $V_2$. The inter-vehicle distance D is used to set the second target lateral speed Vh2 because the following vehicle $V_2$ has less time to confirm the lane change of the subject vehicle $V_0$ and may be delayed for the following vehicle $V_2$ to notice the lane change. Also, if the following vehicle $V_2$ is too slow to notice the lane change of the subject vehicle $V_0$, it may delay the response action such that the following vehicle $V_2$ speeds down and extends the inter-vehicle distance to and from the subject vehicle $V_0$. Therefore, in the embodiment of the present invention, the second target lateral speed Vh2 is set so that the shorter the inter-vehicle distance D is, the lower the lane change lateral speed is.

The "relative speed" shown in the lateral speed setting table of FIG. 4, is a relative speed Vd (km/h) of the following vehicle $V_2$ with respect to the subject vehicle $V_0$ as shown in FIG. 3C. Note that, the relative speed Vd includes a relative speed when the following vehicle $V_2$ is slower than the subject vehicle $V_0$, and a relative speed when the following vehicle $V_2$ is faster than the subject vehicle $V_0$ speed. In this embodiment, the second target lateral speed is set on the basis of the relative speed Vd when the speed of the following vehicle $V_2$ is faster than the speed of the subject vehicle $V_0$. The relative speed Vd is acquired, for example, on the basis of image information outside the vehicle captured by the rear camera of the subject vehicle $V_0$ and a detected result by the rear radar. Graphs showing a coefficient C2 corresponding to the relative speed Vd, the horizontal axis is Vd1~Vd2 (e.g., 50 to 10 km/h) relative speed Vd, the vertical axis is the coefficient C2 of 0.5 to 1.0. That is, the higher the relative speed Vd is, the smaller the coefficient C2 is. The control device 19 acquires the coefficient C2 corresponding to the relative speed Vd by detecting the relative speed Vd and referring to the graph.

The relative speed Vd is used to set the second target lateral speed Vh2 because the higher the relative speed Vd is, the closer the following vehicle $V_2$ approaches the subject vehicle $V_0$ in a shorter time. Since the lane change is to be performed in the vicinity of the following vehicle $V_2$, the relative speed Vd is used for setting the second target lateral speed Vh2. The higher the relative speed Vd is, the more problematic it may be the same as the inter-vehicle distance D is shorter. Therefore, in the embodiment of the present invention, the second target lateral speed Vh2 is set so that the higher the relative speed Vd is, the lower the lane change lateral speed is.

The "road width of the adjacent lane" in the lateral speed setting table of FIG. 4 is a road width Lw (m) of the adjacent lane L2 as a lane change destination, as shown in FIG. 3C. The road width Lw is acquired, for example, by referring to the map information stored in the map database 13. In the graph showing the coefficient C3 corresponding to the road width Lw, the horizontal axis is Lw1~Lw2 (e.g., 4 to 6 m) of the road width Lw, the vertical axis is the coefficient C3 of 0.5 to 1.0. That is, the narrower the road width Lw of the adjacent lane L2 is, the smaller the coefficient C3 is. The control device 19 acquires the coefficient C3 according to the road width Lw by detecting the road width Lw of the adjacent lane L2 and referring to the graph.

The road width Lw of the adjacent lane L2 is used to set the second target lateral speed Vh2 because the narrower the road width Lw, the shorter the lane change of the subject vehicle $V_0$ is completed. The road width Lw of the adjacent lane L2 is used to set the second target lateral speed Vh2 because the following vehicle $V_2$ may be less time to confirm the lane change of the subject vehicle $V_0$ and may be delayed for the following vehicle $V_2$ to notice the lane change. Also, if the following vehicle $V_2$ is too slow to notice the lane change of the subject vehicle $V_0$, it may delay the response action such that the following vehicle $V_2$ speeds down and extends the inter-vehicle distance to and from the subject vehicle $V_0$. Therefore, in the embodiment of the present invention, the second target lateral speed Vh2 is set so that the narrower the road width Lw of the adjacent lane L2 is, the lower the lane change lateral speed is. The road width Lw of the adjacent lane L2 may be acquired from, for example, image information outside the vehicle captured by the front camera or a detected result by the front radar or the side radar, in addition to the map information.

Figure 3D:
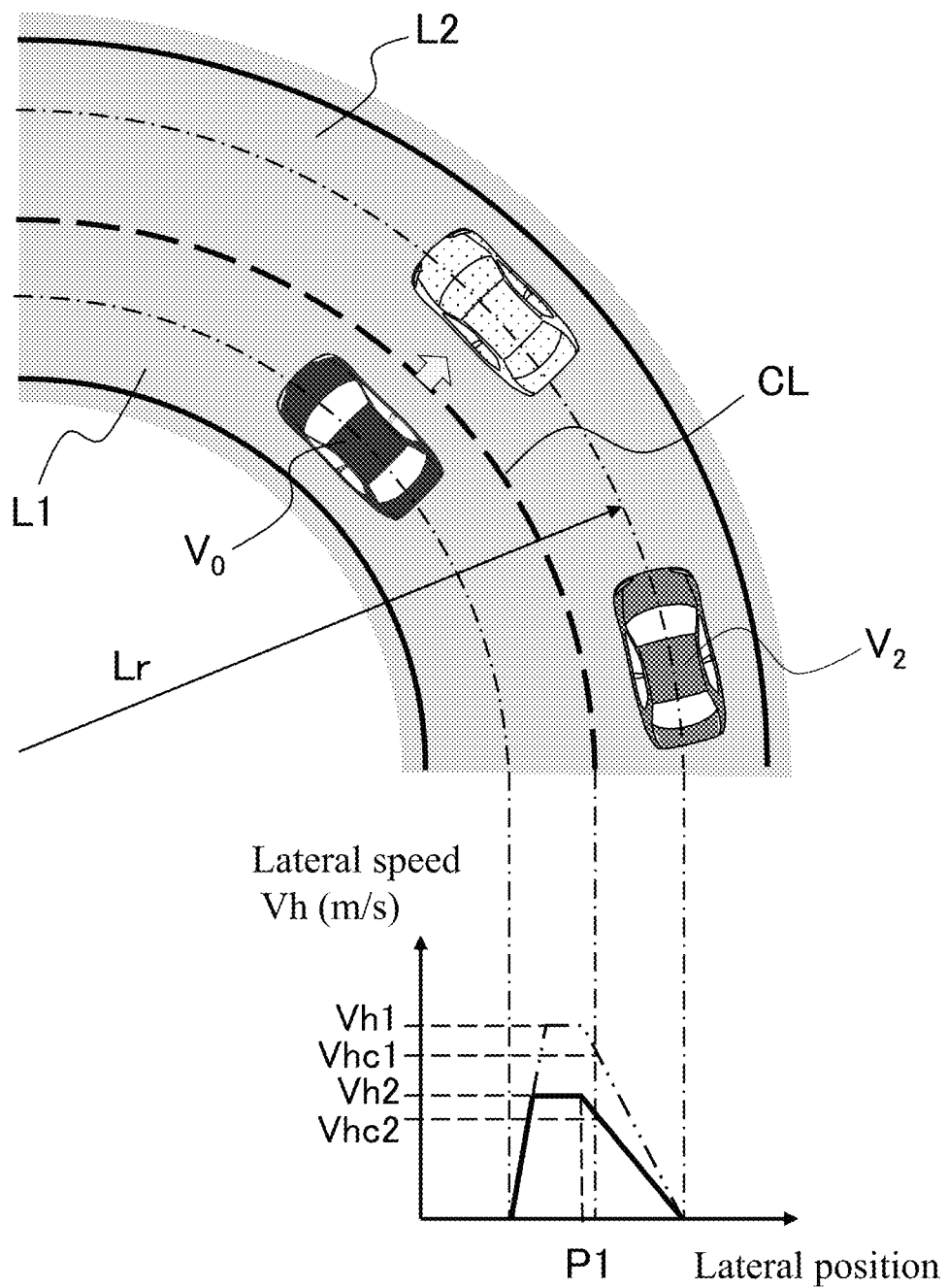
FIG. 3D is a plan view illustrating a scene of a lane change according to one or more embodiments of the present invention, and a graph illustrating a state in which the second target lateral speed is changed according to the radius of the adjacent lane in the second lateral speed control according to the first embodiment of the travel control apparatus for a vehicle according to the present invention.

The "radius of the adjacent lane" in the lateral speed setting table of FIG. 4 is a radius Lr (m) of the curved road when the adjacent lane L2 as the lane change destination is the curved road as shown in FIG. 3D. The radius Lr is acquired by referring to the map information stored in map database 13 for example. The graph of the coefficient C4 for radius Lr shows the radius Lr with Lr1~Lr2 (e.g., 100-1000 m) on the horizontal axis and the coefficient C4 with 0.5-1.0 on the vertical axis. The shorter the radius Lr of the adjacent lane L2 is, the smaller the coefficient C4 is. The control device 19 acquires the coefficient C4 according to the radius Lr by detecting the radius Lr and referring to the graphs. When the adjacent lane L2 is a straight road, 1.0 is set to the coefficient C4.

The radius Lr of the adjacent lane L2 is used to set the second target lateral speed Vh2 because the shorter the radius Lr is, the less visible the preceding subject vehicle $V_0$ from following vehicle $V_2$ and the more likely it may be delayed to notice the lane change. Also, if the following vehicle $V_2$ is too slow to notice the lane change of the subject vehicle $V_0$, the following vehicle V2 may not be able to take the response action such that the following vehicle $V_2$ speeds down to extend the inter-vehicle distance between the following vehicle and the subject vehicle V0. Therefore, in the embodiment of the present invention, the second target lateral speed Vh2 is set so that the shorter the radius Lr of the adjacent lane L2 is, the lower the lane change lateral speed is. Incidentally, in addition to acquiring from the map information, the radius Lr may be acquired from the image information outside the vehicle captured by the front camera and the detection result by the front radar or side radar for example.

The "amount of rainfall" in the lateral speed setting table of FIG. 4 is an amount of rainfall at the current position of the subject vehicle $V_0$, and for example, an intermittent speed of windshield wiper is used. The graph of the coefficient C5 corresponding to the amount of rainfall, has a the horizontal axis is intermittent speed of windshield wiper (for example, high-speed, medium-speed and low-speed) and the vertical axis is the coefficient C5 of 0.5 to 1.0. Thus, the smaller the coefficient C5 is, the higher the intermittent speed of windshield wiper is, i.e., the larger the amount of rainfall is. When the weather is not rainfall and the windshield wiper is not operating, 1.0 is set to the coefficient C5.

The amount of rainfall is used to set the second target lateral speed Vh2 because the larger the amount of rainfall is, the more difficult it is for the preceding subject vehicle $V_0$ from the following vehicle $V_2$ to be seen, and there is a possibility that it may be delayed for the following vehicle $V_2$ to notice the lane change. Also, if the following vehicle $V_2$ is too slow to notice the lane change of the subject vehicle $V_0$, it may delay the response action such that the following vehicle $V_2$ speeds down and extends the inter-vehicle distance to and from the subject vehicle $V_0$. Therefore, in the embodiment of the present invention, the second target lateral speed Vh2 is set so that the larger the amount of rainfall is, the lower the lane change lateral speed is. When the subject vehicle $V_0$ has a raindrop sensor, the travel information of the "amount of rainfall" may be acquired from the detection result of the raindrop sensor, or the travel information of the "amount of rainfall" may be determined by combining the detection result of the raindrop sensor and the intermittent speed of the windshield wiper.

The control device 19 uses the second lateral speed control of the autonomous lane change control function to calculate the second target lateral speed Vh2 by using the following equation (a). Specifically, the control device 19 multiplies the preset first target lateral speed Vh1 by the coefficients C1 to C5 acquired from the lateral speed setting table to calculate the second target lateral speed Vh2.

$$Vh2 = Vh1 \times C1 \times C2 \times C3 \times C4 \times C5 \qquad \text{(a)}$$

When the traveling condition of the subject vehicle $V_0$ does not satisfy the condition of the travel information set in the lateral speed setting table of FIG. 4, all of the coefficients C1 to C5 are 1.0, therefore, the second target lateral speed Vh2 has the same lateral speed as the first target lateral speed Vh1. Conversely, when the traveling condition of the subject vehicle $V_0$ meets the requirements of two or more travel information set in the lateral speed setting table, the second target lateral speed Vh2 becomes extremely low, and it takes too long to change the lane. Therefore, the control device 19 may set the lower limit value of the second target lateral speed Vh2 in advance, and when the calculated second target lateral speed Vh2 is lower than the lower limit value, the lower limit value may be set as the second target lateral speed Vh2.

In the second lateral speed control according to first embodiment of the present invention, the target lateral speed of the subject vehicle $V_0$ in the subject vehicle lane L1 is changed in order to change the lane change lateral speed of the subject vehicle $V_0$. Alternatively, the timing at which the subject vehicle $V_0$ begins decelerating the lateral speed may be changed. Hereinafter, a second lateral speed control according to the second embodiment of the present invention will be described in which the lane change lateral speed is changed by changing the timing at which the lateral speed deceleration of the subject vehicle $V_0$ is started.

FIG. 5 shows the control details of the second lateral speed control according to the second embodiment executed by the autonomous lane change control function of the control device 19. FIG. 5 includes a plan view showing the travel scene upon the lane change and a graph showing the lateral speed of the subject vehicle upon the lane change. In the second lateral speed control, the lane change lateral speed is changed by setting the timing of decelerating the lateral speed Vh in the travel scene in which the subject vehicle $V_0$ performs the lane change from the subject vehicle lane L1 to the adjacent lane L2.

As shown in the graph of FIG. 5, in the second lateral speed control of the embodiment, after the lateral speed of the subject vehicle $V_0$ is accelerated to the first target lateral speed Vh1 in the subject vehicle lane L1, the deceleration of the lateral speed of the subject vehicle $V_0$ is started within the same subject vehicle lane L1. The timing P2 at which the deceleration is started is set to a timing earlier than the timing P1 used in the explanation of FIG. 3B. That is, the deceleration is started at a position farther from the object lane marks CL than the position of the timing P1. The lane change lateral speed Vhc3 when the subject vehicle $V_0$ exceeds the object lane marks CL between the subject vehicle lane L1 and the adjacent lane L2 becomes lower than the lane change lateral speed Vhc1 when the deceleration of the lateral speed is started at the time P1.

It is preferable that the timing P2 at which the deceleration of the lateral speed is started is set on the basis of the acquired travel information in the same manner as the of the second lateral speed control related to the first embodiment of the present invention. More specifically, the ROM of the control device 19 stores a timing setting table in which the travel information used for setting the timing P2 and coefficient information used for calculating the timing P2 are associated with each other. As the timing setting table, similarly to the lateral speed setting table shown in FIG. 4, a graph or an equation for acquiring the coefficient is stored for each travel information such as "inter-vehicle distance", "relative speed", "road width of the adjacent lane", "radius of the adjacent lane" and "amount of rainfall".

When performing the lane change by executing such second lateral speed control, the control device 19 acquires the coefficient corresponding to the travel information acquired by referring to the timing setting table. Then, the control device 19 calculates the timing P2 by multiplying the calculated coefficient to the timing P1 as a reference. Note that, the timing P1 is set as the elapsed time after the lane change is started. As a result, the control device 19 can change the lane change lateral speed when the subject vehicle $V_0$ exceeds the object lane marks CL between the subject vehicle lane L1 and the adjacent lane L2 in accordance with the travel information, similarly to the case in which the second target lateral speed Vh2 is changed by the first embodiment of the present invention.

The lane change information presentation function of the control device 19 is a function of presenting the driver, via the presentation device 15, with lane change information regarding the travel operation of the subject vehicle executed by the autonomous lane change control. For example, when a branching point of a road or an exit of an expressway exists ahead during execution of the lane keeping control, changing lanes may be necessary by changing the traveling direction of the subject vehicle. Additionally or alternatively, when a preceding vehicle changes lanes during execution of the follow-up control of following the preceding vehicle, the subject vehicle may also change lanes accordingly. When such lane changes are executed by the autonomous travel control, the control device 19 uses the lane change information presentation function to present the driver with the lane change information in order to encourage the driver to confirm safety by himself/herself. The timing of presenting the lane change information may be at least before the start of the autonomous lane change control because the presentation of the lane change information is for the purpose of safety confirmation by the driver himself/herself, but the lane change information may also be presented during execution of the autonomous lane change control and/or at the time of completion of the autonomous lane change control.

When the presentation device 15 includes a display, the form of presentation on the presentation device 15 using the lane change information presentation function may be a form of display of a visual pattern including an image, a language, etc. Additionally or alternatively, when the presentation device 15 includes a speaker, the autonomous lane change control may be performed to present the driver with the lane change information including the direction of movement of the subject vehicle in the road width direction (e.g., guidance information indicating the lane change in the right or left direction) as audio information (voice or sound). Additionally or alternatively, when the presentation device 15 includes one or more warning lamps installed on the instrument panel or the like, a specific warning lamp may be lit in a specific presentation form thereby to perform the autonomous lane change control to present the driver with the lane change information including the direction of movement of the subject vehicle in the road width direction. Additionally or alternatively, when the presentation device 15 includes a seat device with a plurality of embedded vibrating bodies, a specific vibrating body may be vibrated in a specific presentation form thereby to perform the autonomous lane change control to present the driver with the lane change information including the direction of movement of the subject vehicle in the road width direction.

Thus, instead of or in addition to displaying the lane change information on the display as visual information, presenting the driver with the lane change information as audio information such as voice and sound, as visual information via the display of a warning lamp, or as tactile information via the vibration allows the driver to more intuitively perceive the lane change information.

The acceptance confirmation function of the control device 19 is a function of confirming whether or not the driver has accepted the autonomous lane change control regarding the lane change information presented by the lane change information presentation function. The control device 19 receives an input operation to an input device 16 by the driver, for example, an operation of the dial switch, an operation of the touch panel arranged on the display screen, an audio input to the microphone, an operation of the flasher, or the like after the lane change information is presented by the acceptance confirmation function and the lane change information presentation function. The control device 19 determines whether or not the driver accepts the autonomous lane change control on the basis of these inputting operations by the acceptance confirmation function.

An autonomous lane change control process according to one or more embodiments of the present invention will now be described with reference to FIGS. 6A to 6E. FIGS. 6A to 6E are flowcharts illustrating the autonomous lane change control process according to one or more embodiments of the present invention. The autonomous lane change control process described below is executed by the control device 19 at predetermined time intervals. In the following explanations, the scene of the autonomous lane change control shown in FIG. 7A will be explained by the travel control function of control device 19 on the assumption as follows. That is, while the lane keeping control for controlling the traveling position of the subject vehicle $V_0$ in road width direction is performed so that the subject vehicle $V_0$ travels in the subject vehicle lane L2 which is a center lane of the road having three lanes on one side, the lane change to the adjacent lane L3 on the right-side will be executed because a branch point of the road exists in the front. Upon the lane change, the first lateral speed control or the second lateral speed control related to the first embodiment of the present invention is executed depending on whether or not it is the following vehicle $V_2$ to travel the adjacent lane L3.

Figure 6A:
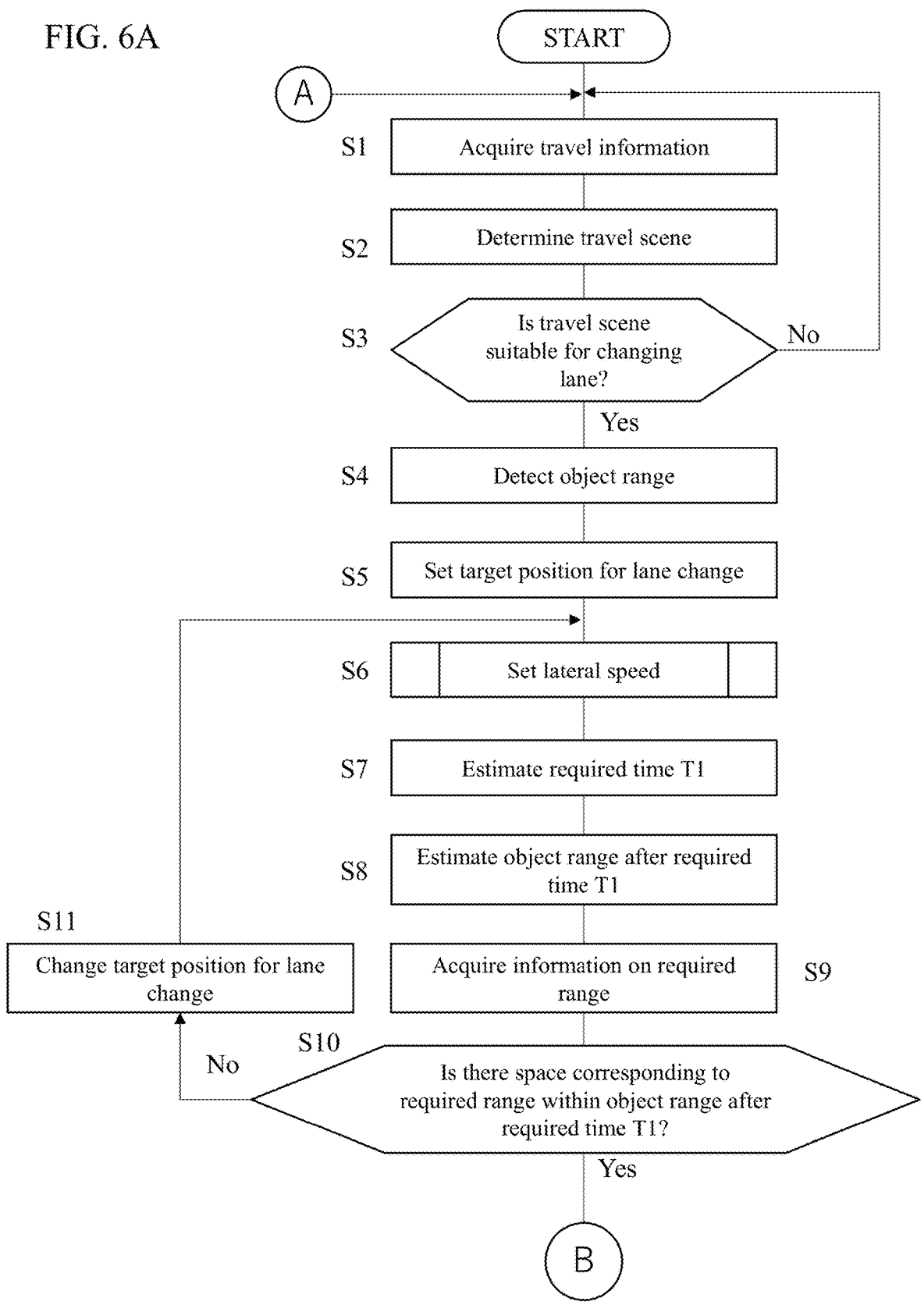
FIG. 6A is a flowchart (part 1) illustrating a lane change control process executed by the travel control apparatus for a vehicle according to the embodiment of the present invention.

First, in step S1 of FIG. 6A, the control device 19 uses the travel information acquisition function to acquire the travel information regarding the traveling state of the subject vehicle. Step S1 is followed by step S2, in which the control device 19 uses the travel scene determination function to determine the travel scene of the subject vehicle on the basis of the travel information acquired in step S1.

In step S3, the control device 19 uses the travel scene determination function to determine whether or not the travel scene of the subject vehicle determined in step S2 is a travel scene suitable for changing lanes. Specifically, when the travel scene of the subject vehicle is any of travel scenes illustrated in FIG. 2, the travel scene determination function is used to determine that the travel scene of the subject vehicle is a travel scene suitable for changing lanes. When the travel scene of the subject vehicle is not a travel scene suitable for changing lanes, the process returns to step S1, from which the determination of the travel scene is repeated. When the travel scene of the subject vehicle is a travel scene suitable for changing lanes, the process proceeds to step S4.

In step S4, the control device 19 uses the autonomous lane change control function to detect object ranges. Specifically, the control device 19 uses the autonomous lane change control function to detect obstacles existing around the subject vehicle on the basis of the external image information around the vehicle captured by the front camera and rear camera included in the sensors 11 and/or the travel information including the detection results by the front radar, rear radar, and side radars included in the sensors 11. Then, the control device 19 uses the autonomous lane change control function to detect ranges that are located on a side of the subject vehicle and in which no obstacles exist, as the object ranges.

The "object ranges" in one or more embodiments of the present invention refer to relative ranges with reference to the traveling position when the subject vehicle travels at the current speed; therefore, when another vehicle existing around the subject vehicle travels straight ahead at the same speed as the subject vehicle, the object ranges do not vary. The "side of the subject vehicle" refers to a range in which the position on the side of the subject vehicle can be taken as a target position for changing lanes when the subject vehicle changes lanes (this target position is also a relative position with reference to the traveling position when the subject vehicle travels at the current speed), and this range (such as direction, size, and angle) can be set as appropriate. Methods of detecting object ranges OS will be described below with reference to FIGS. 7A to 7F. FIGS. 7A to 7E are plan views for describing object ranges OS.

Figure 7A:
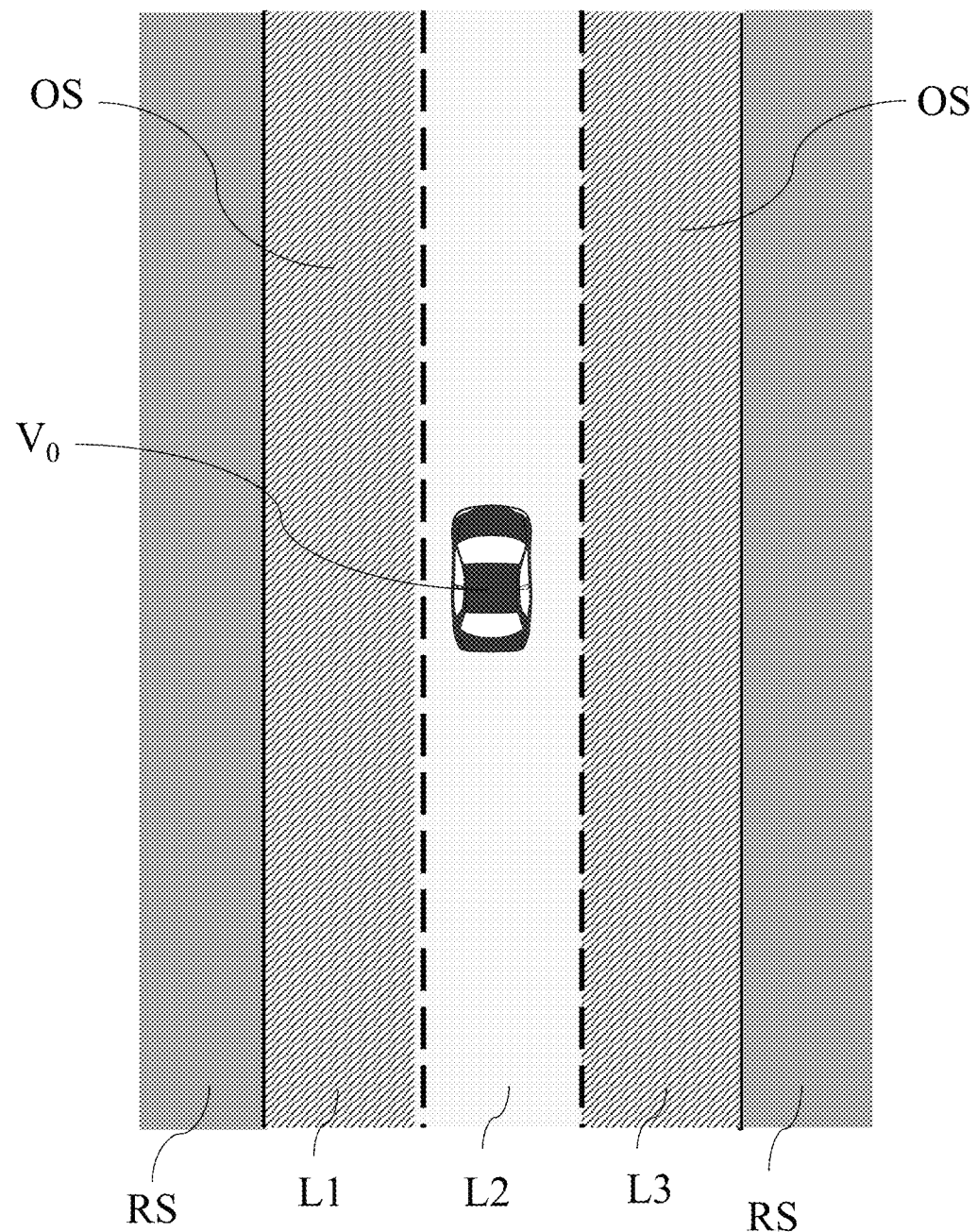
FIG. 7A is a plan view (part 1) for describing a method of detecting object ranges executed by the travel control apparatus for a vehicle according to the embodiment of the present invention.

In an example of a scene illustrated in FIG. 7A, another vehicle $V_1$ that is an obstacle does not exist neither in a left adjacent lane L1 adjacent to a lane L2 in which the subject vehicle $V_0$ travels nor in a right adjacent lane L3. In this case, the control device 19 uses the autonomous lane change control function to detect the adjacent lanes L1 and L3 as object ranges OS. Note that road shoulders RS are excluded from the object ranges OS because the road shoulders RS are basically within ranges in which changing lanes cannot be performed. Note, however, that when the travel scene of the subject vehicle $V_0$ is an "emergency evacuation scene" on a road on which emergency stop or the like is permitted at the road shoulders RS, the road shoulders RS can be included in the object ranges OS (here and hereinafter).

Figure 7B:
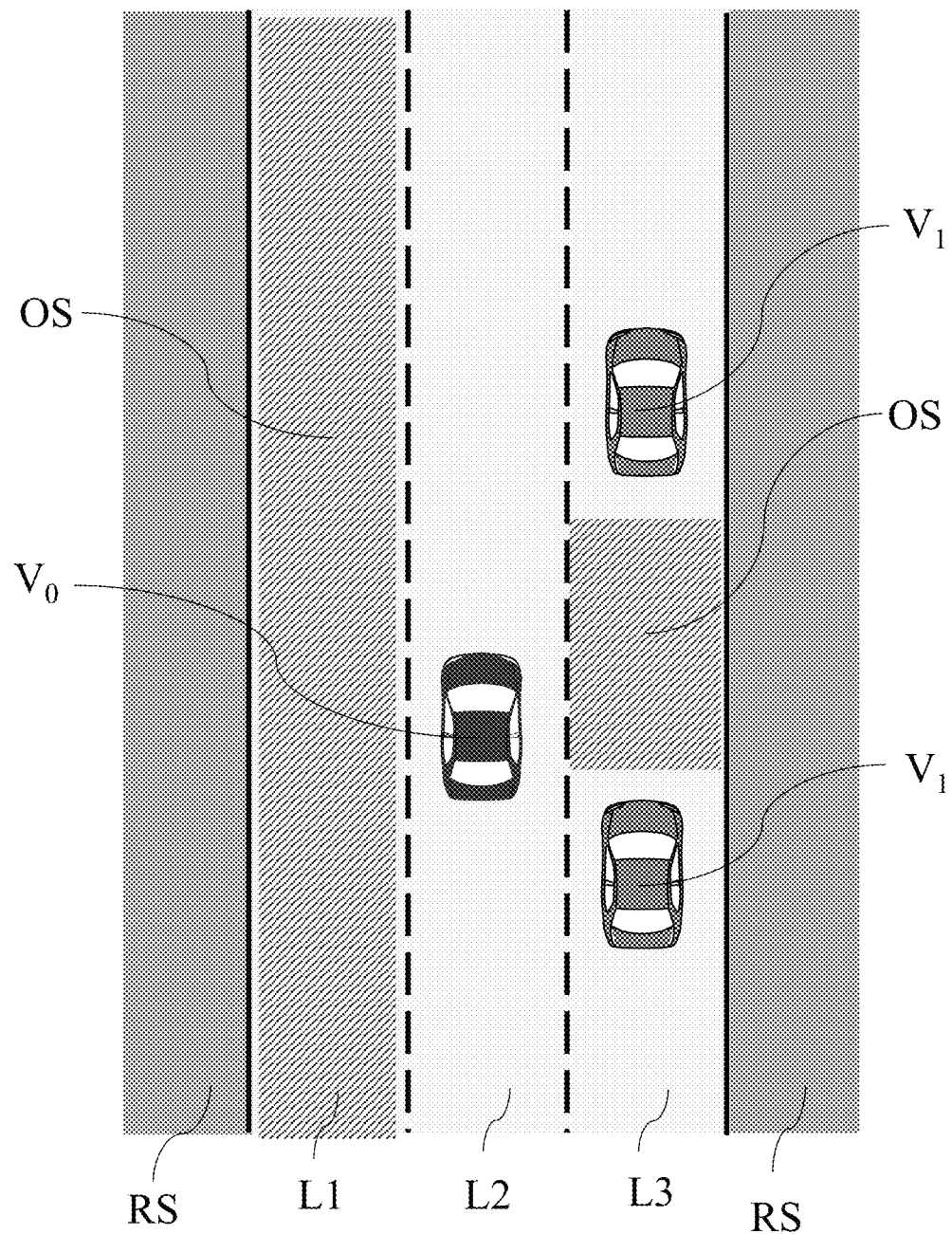
FIG. 7B is a plan view (part 2) for describing a method of detecting object ranges executed by the travel control apparatus for a vehicle according to the embodiment of the present invention.

In an example of a scene illustrated in FIG. 7B, no other vehicles exist in the left adjacent lane L1 adjacent to the lane L2 in which the subject vehicle $V_0$ travels, but other vehicles $V_1$ and $V_1$ that are obstacles exist in the right adjacent lane L3 adjacent to the lane L2. A range in which no other vehicles exist, however, is present in the adjacent lane L3 between the front other vehicle $V_1$ traveling ahead of a space adjacent to the lane L2 in which the subject vehicle $V_0$ travels and the rear other vehicle $V_1$ traveling behind that space. The control device 19 uses the autonomous lane change control function to detect, as the object ranges OS, the left adjacent lane L1 and the range of the right adjacent lane L3 in which no other vehicles exist.

Figure 7C:
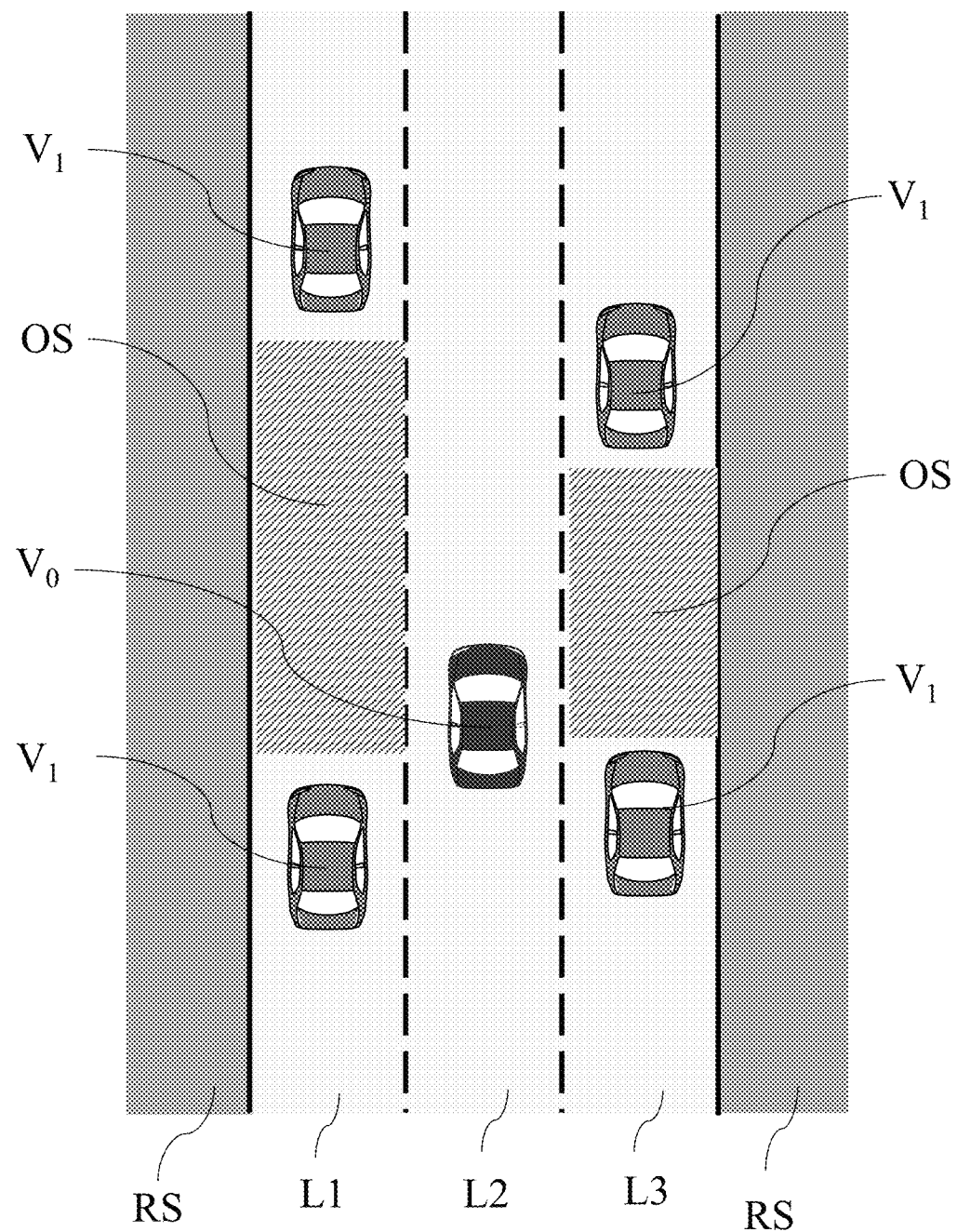
FIG. 7C is a plan view (part 3) for describing a method of detecting object ranges executed by the travel control apparatus for a vehicle according to the embodiment of the present invention.

In an example of a scene illustrated in FIG. 7C, a range in which no other vehicles exist is present in the right adjacent lane L3 as in the example illustrated in FIG. 7B, and a range in which no other vehicles exist is also present in the left adjacent lane L1 between the front other vehicle $V_1$ and the rear other vehicle $V_1$. In this case, the control device 19 uses the autonomous lane change control function to detect, as the object ranges OS, the range in the left adjacent lane L1 in which no other vehicles exist and the range in the right adjacent lane L3 in which no other vehicles exist.

Figure 7D:
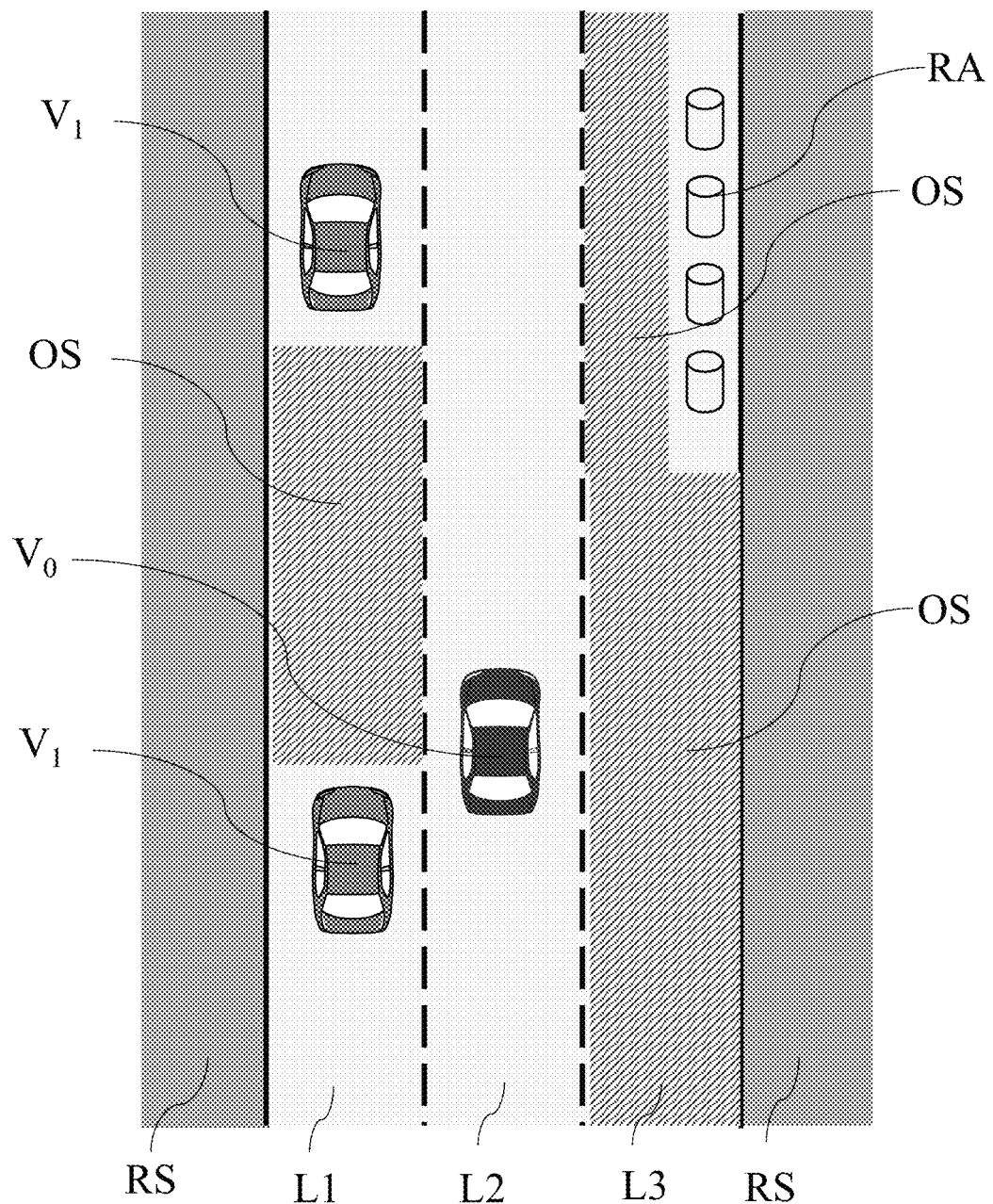
FIG. 7D is a plan view (part 4) for describing a method of detecting object ranges executed by the travel control apparatus for a vehicle according to the embodiment of the present invention.

In an example of a scene illustrated in FIG. 7D, a range in which no other vehicles exist is present in the left adjacent lane L1 as in the example illustrated in FIG. 7C, and no other vehicles exist in the right adjacent lane L3, but the right adjacent lane L3 includes a range RA, such as a construction section or a space occupied by a damaged vehicle, in which the subject vehicle $V_0$ cannot travel. In this case, the control device 19 uses the autonomous lane change control function to detect the object ranges OS by excluding the range RA, such as a construction section or a space occupied by a damaged vehicle, in which the subject vehicle $V_0$ cannot travel, from the object ranges OS. Examples of the range RA in which the subject vehicle $V_0$ cannot travel include, in addition to a construction section, a range in which another vehicle $V_1$ parks or stops and a range in which vehicles are prohibited from traveling due to traffic regulation or the like. As illustrated in FIG. 7D, when the range RA in which the subject vehicle $V_0$ cannot travel due to a construction section or the like occupies half or more of the adjacent lane L3 (half or more in the road width direction), for example, the remaining less than half of the range may be excluded from the object ranges OS.

Figure 7E:
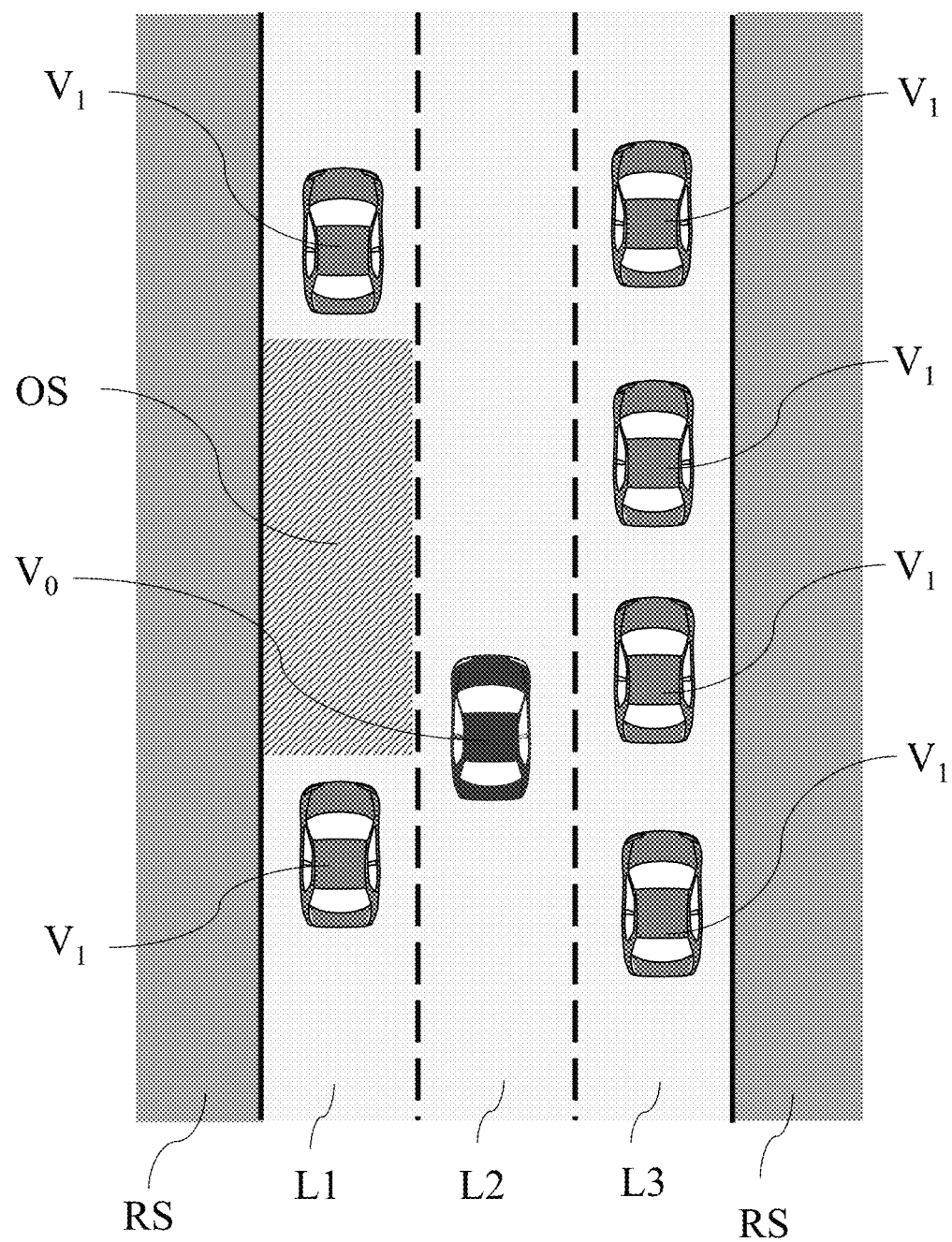
FIG. 7E is a plan view (part 5) for describing a method of detecting object ranges executed by the travel control apparatus for a vehicle according to the embodiment of the present invention.

In an example of a scene illustrated in FIG. 7E, a range in which no other vehicles exist is present in the left adjacent lane L1, but other vehicles $V_1$ are traveling in series in the right adjacent lane L3, and the right adjacent lane L3 does not include a space to which changing lanes is possible. In this case, the control device 19 uses the autonomous lane change control function to determine that the object ranges OS cannot be detected in the right adjacent lane L3.

Figure 7F:
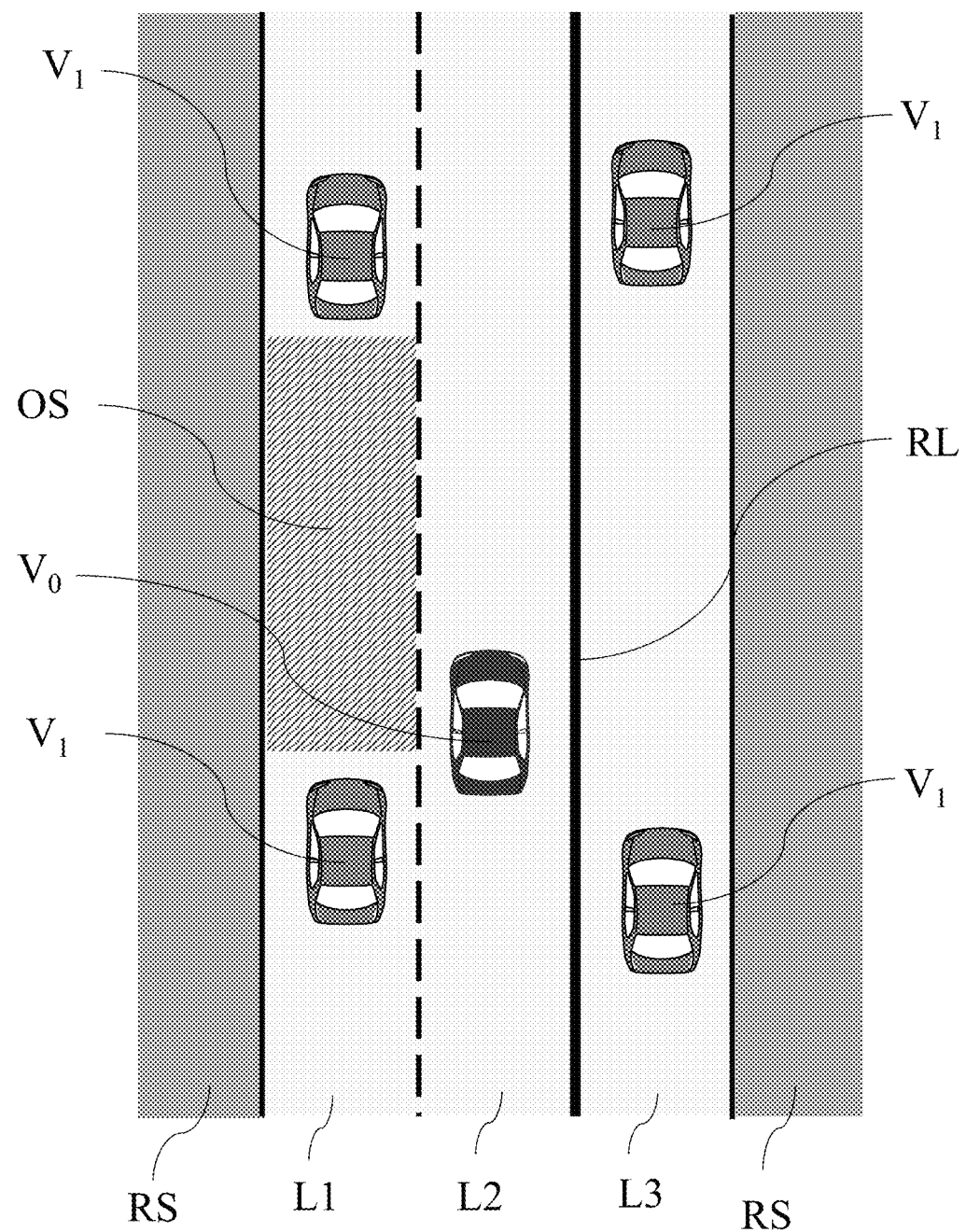
FIG. 7F is a plan view (part 6) for describing a method of detecting object ranges executed by the travel control apparatus for a vehicle according to the embodiment of the present invention.

In an example of a scene illustrated in FIG. 7F, lane change from the subject vehicle lane L2 to the right adjacent lane L3 is prohibited by a mark RL indicating the prohibition of lane change. On such a road, the control device 19 uses the autonomous lane change control function to determine that the object ranges OS cannot be detected in the right adjacent lane L3.

The control device 19 in one or more embodiments of the present invention uses the autonomous lane change control function to detect the object ranges OS in a direction, among right and left directions, which is suitable for changing lanes in the travel scene of the subject vehicle $V_0$. In one or more embodiments of the present invention, the direction suitable for changing lanes in each travel scene is preliminarily stored in the scene determination table illustrated in FIG. 2. The control device 19 uses the autonomous lane change control function to refer to the scene determination table illustrated in FIG. 2 to acquire information on the "direction of changing lanes" in the travel scene of the subject vehicle $V_0$. For example, when the travel scene of the subject vehicle $V_0$ is a "scene of catching up with preceding vehicle," the control device 19 uses the autonomous lane change control function to refer to the scene determination table of FIG. 2 to acquire a direction "toward overtaking lane side" as the "direction of changing lanes." Then, the control device 19 uses the autonomous lane change control function to detect the object ranges OS in the acquired "direction of changing lanes."

Additionally or alternatively, the control device 19 uses the autonomous lane change control function to detect the object ranges OS on a side of the subject vehicle $V_0$. For example, even when ranges in which no obstacles exist are detected in the left adjacent lane L1 and the right adjacent lane L3, if the ranges are separate from the current position of the subject vehicle $V_0$ by a certain distance or more and located behind or ahead of the subject vehicle, it may be difficult to change lanes to such ranges, which are therefore not detected as the object ranges OS.

Figure 8:
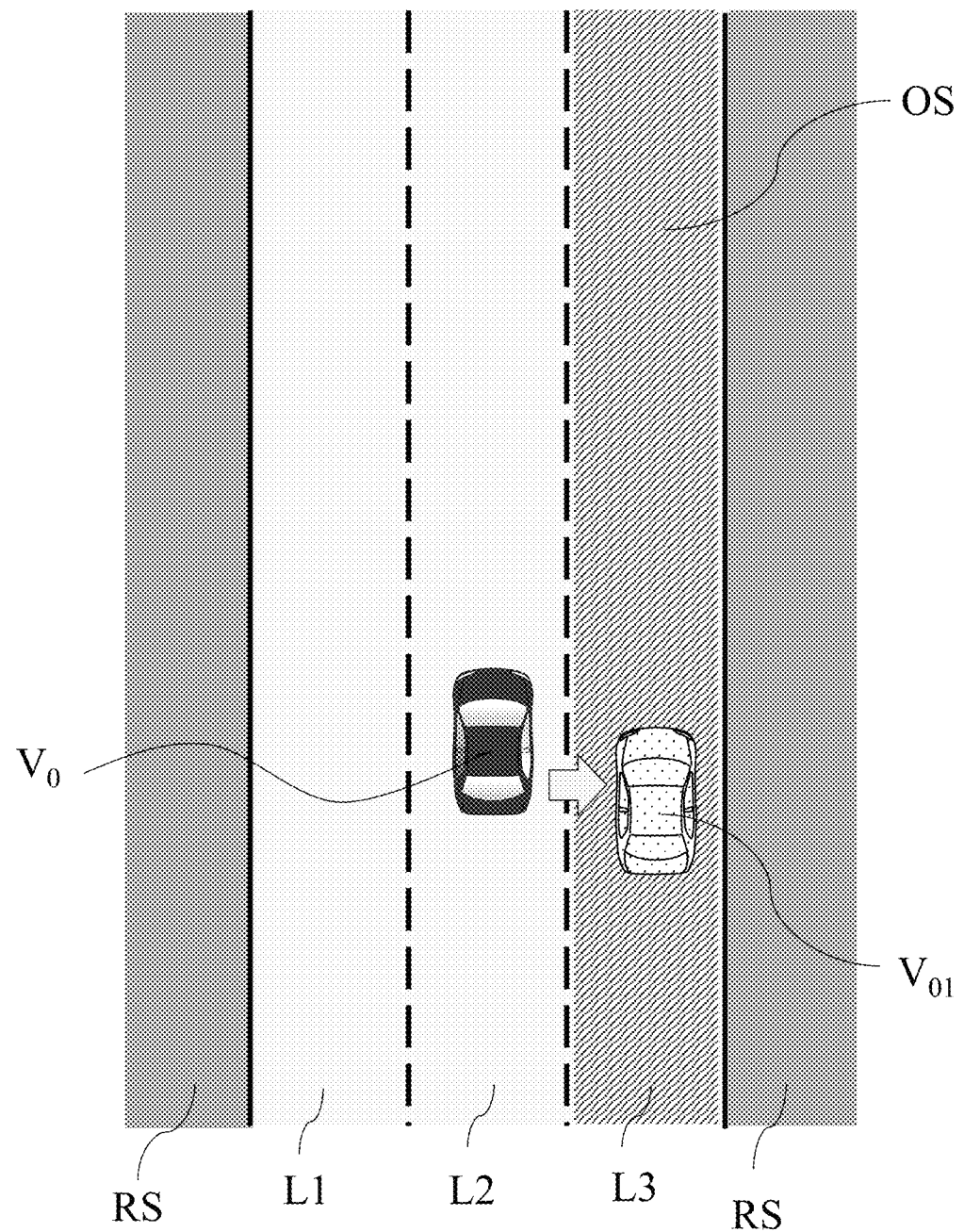
FIG. 8 is a plan view for describing a method of setting target positions for lane changes, wherein the method is executed by the travel control apparatus for a vehicle according to the embodiment of the present invention.

Referring again to FIG. 6A, in step S5, the control device 19 uses the autonomous lane change control function to set target positions for lane changes. FIG. 8 is a diagram for describing a method of setting the target positions for lane changes. For example, as illustrated in FIG. 8, the control device 19 uses the autonomous lane change control function to set a position that is within the object range OS in the right adjacent lane L3 detected in step S4 and that is shifted backward from the position of the subject vehicle $V_0$ by a small distance, as the target positions for lane changes (e.g., the positions of vehicle $V_{01}$ illustrated in FIG. 8). The target positions for lane changes (positions of the vehicle $V_{01}$) are relative positions with respect to the position at which the subject vehicle $V_0$ travels. That is, provided that the position when the subject vehicle $V_0$ travels at the current speed without changing the speed is a reference position, positions located laterally behind the reference position by a small distance are set as the target positions for lane changes. This allows the subject vehicle $V_0$ to change lanes to the right adjacent lane L3 without accelerating the subject vehicle $V_0$ when the subject vehicle $V_0$ moves to the target positions for lane changes.

The control device 19 may use the autonomous lane change control function to set the target positions for lane changes by taking into account the ease of lane changes, such as a situation that the object ranges OS in the right adjacent lane L3 include a range to which the subject vehicle $V_0$ can move and a situation that another vehicle $V_1$ that may enter an object range OS does not exist around the subject vehicle $V_0$. For example, when another vehicle $V_1$ existing around an object range OS lights the blinkers toward the object range OS and/or travels while deviating toward the object range OS side, the autonomous lane change control function is used to determine that the other vehicle $V_1$ may enter the object range OS. In this case, another position in an object range OS which the other vehicle $V_1$ is less likely to enter may be set as a target position. In the above exemplary case, the target positions for lane changes are set at positions located behind the subject vehicle $V_0$ and within the object ranges OS in the adjacent lane L3. In an alternative embodiment, the target positions for lane changes may be set at positions located ahead of the subject vehicle $V_0$ and within the object ranges OS in the adjacent lane L3. In an alternative embodiment, step S5 may include setting target routes for performing lane changes instead of setting the target positions for lane changes.

Referring again to FIG. 6A, in step S6, the control device 19 uses the autonomous lane change control function to set the lateral speed. FIG. 6D illustrates a flow chart showing a subroutine of the lateral speed setting process executed in step S6. In step S61 of FIG. 6D, the control device 19 detects whether or not a following vehicle $V_2$ exists in the adjacent lane L3 as the lane change destination by the autonomous lane change control function. Then, the control device 19 selects whether to execute the first lateral speed control or the second lateral speed control in accordance with the presence or absence of the following vehicle $V_2$. The control device 19 has finished acquiring various travel information in step S1 by the travel information acquisition function. Therefore, the control device 19 determines the presence or absence of the following vehicle in the adjacent lane on the basis of the acquired travel information by the autonomous lane change control function, specifically, on the basis of the image information outside the vehicle captured by the rear camera of the subject vehicle $V_0$ and the result detected by the rear radar.

When no following vehicle $V_2$ is detected in step S61 by the autonomous lane change control function, the control device 19 selects the first lateral speed control in step S62. Further, the control device 19 uses the autonomous lane change control function to set the first target lateral speed Vh1 as a target lateral speed to accelerate upon the lane change in step S63.

When the following vehicle $V_2$ is detected in step S61 by the autonomous lane change control function, the control device 19 selects the second lateral speed control in step S64, and sets the second target lateral speed Vh2 in the subsequent steps.

In step S65, the control device 19 acquires the travel information required for setting the second target lateral speed Vh2 by the autonomous lane change control function. Specifically, the control device 19 uses the autonomous lane change control function to acquire the inter-vehicle distance D between the subject vehicle $V_0$ and the following vehicle $V_2$, the relative speed Vd of the following vehicle $V_2$ for the subject vehicle $V_0$, the road width Lw of the adjacent lane, the radius Lr of the adjacent lane and the intermittent speed of the windshield wiper providing the amount of rainfall.

In the next step S66, the control device 19 uses the autonomous lane change control function to refer to the lateral speed setting table shown in FIG. 4, and to acquire the coefficients C1 to C5 corresponding to the travel information on the basis of the acquired inter-vehicle distance D, the acquired relative speed Vd, the acquired road width Lw, the acquired radius Lr, and the acquired intermittent speed of the windshield wiper. For example, the coefficient C1 is 0.5 when the inter-vehicle distance D is 10 m, and the coefficient C1 is 1.0 when the inter-vehicle distance D is 200 m or more. Similarly, the coefficients C2 to C5 are extracted from the lateral speed setting table.

In the next step S67, the control device 19 uses the autonomous lane change control function to calculate the second target lateral speed Vh2 by using equation (a) described above. Specifically, the first target lateral speed Vh1 is multiplied by the coefficients C1 to C5 to calculate the second target lateral speed Vh2. For example, when the first target lateral speed Vh1 is 0.5 m/sec, the coefficient C1 of the inter-vehicle distance D is 0.9, the coefficient C2 of the relative speed Vd is 0.9, the coefficient C3 of the road width Lw is 1.0, the coefficient C4 of the radius Lr is 0.8, and the coefficient C5 of the amount of rainfall is 1.0, the second target lateral speed Vh2 is 0.324 m/s. In the next step S68, the control device 19 uses the autonomous lane change control function to set the calculated second target lateral speed Vh2 as a target lateral speed to accelerate upon the lane change.

Incidentally, in the setting of the lateral speed in step S6, when executing the lateral speed control of the second embodiment of the present invention, the control device 19 uses the autonomous lane change control function to set the timing P2 to decelerate the lateral speed instead of the second target lateral speed.

Referring again to FIG. 6A, in step S7, the control device 19 uses the autonomous lane change control function to estimate a required time T1 for the lane changes. For example, the control device 19 uses the autonomous lane change control function to estimate a time required for the subject vehicle to move from the current position to a target position for the lane changes as the required time T1 on the basis of the vehicle speed and/or acceleration of the subject vehicle. Accordingly, when the width of a lane is wide, or when the road is congested, for example, the required time T1 is estimated as a long time.

In step S8, the control device 19 uses the autonomous lane change control function to estimate an object range OS after the required time T1 estimated in step S7. Specifically, the control device 19 uses the autonomous lane change control function to estimate the traveling position after the required time T1 of another vehicle $V_1$ existing around the subject vehicle $V_0$ on the basis of the vehicle speed and acceleration of the other vehicle $V_1$. For example, the control device 19 uses the autonomous lane change control function to repeatedly detect the positional information of the other vehicle $V_1$ thereby to calculate the speed vector $v_0$, acceleration vector $a_0$, and positional vector $p_0$ of the other vehicle $V_1$, as illustrated in FIG. 9A.

Figure 9A:
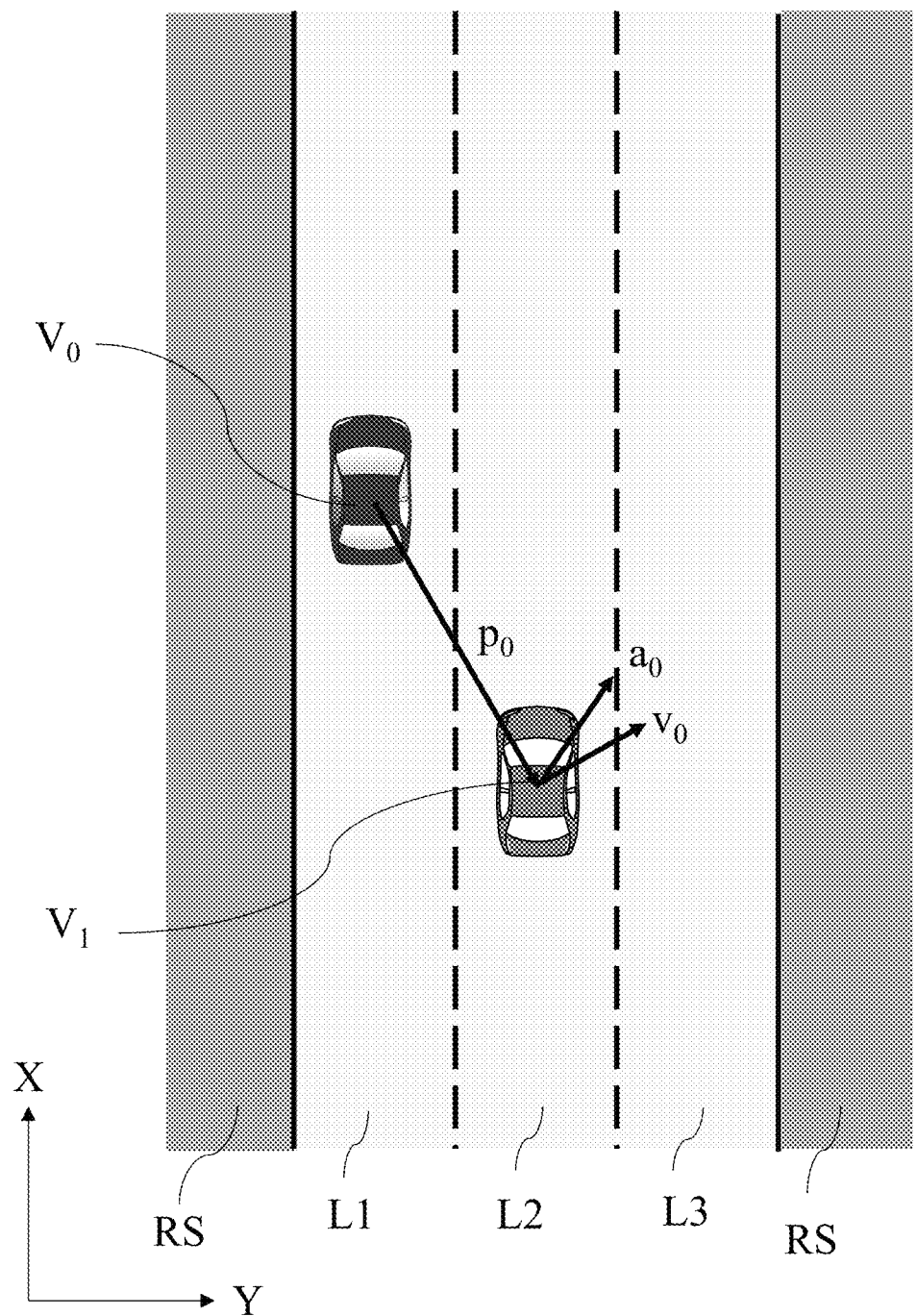
FIG. 9A is a plan view (part 1) for describing a method of estimating the position of another vehicle after a required time, wherein the method is executed by the travel control apparatus for a vehicle according to the embodiment of the present invention.

As illustrated in FIG. 9A, when the traveling direction of the subject vehicle $V_0$ is along X-axis and the road width direction is along Y-axis, the speed vector $v_0$ of the other vehicle $V_1$ is represented by the following equation (1).

$$v_0 = vx_0 i + vy_0 j \quad (1)$$

In the above equation (1), $vx_0$ represents a speed component in the X-axis direction of the speed vector $v_0$ of the other vehicle $V_1$ and $vy_0$ represents a speed component in the Y-axis direction of the speed vector $v_0$ of the other vehicle $V_1$. In the above equation (1), i represents a unit vector in the X-axis direction and j represents a unit vector in the Y-axis direction (the same applies to the following equations (2), (3), and (6)).

The acceleration vector $a_0$ of the other vehicle $V_1$ can be obtained as represented by the following equation (2) while the positional vector $p_0$ of the other vehicle $V_1$ can be obtained as represented by the following equation (3).

$$a_0 = ax_0 i + ay_0 j \quad (2)$$

$$p_0 = px_0 i + py_0 j \quad (3)$$

In the above equation (2), $ax_0$ represents an acceleration component in the X-axis direction of the acceleration vector $a_0$ of the other vehicle $V_1$ and $ay_0$ represents an acceleration component in the Y-axis direction of the acceleration vector $a_0$ of the other vehicle $V_1$. In the above equation (3), $px_0$ represents a positional component in the X-axis direction of the positional vector $p_0$ of the other vehicle $V_1$ and $py_0$ represents a positional component in the Y-axis direction of the positional vector $p_0$ of the other vehicle $V_1$.

Figure 9B:
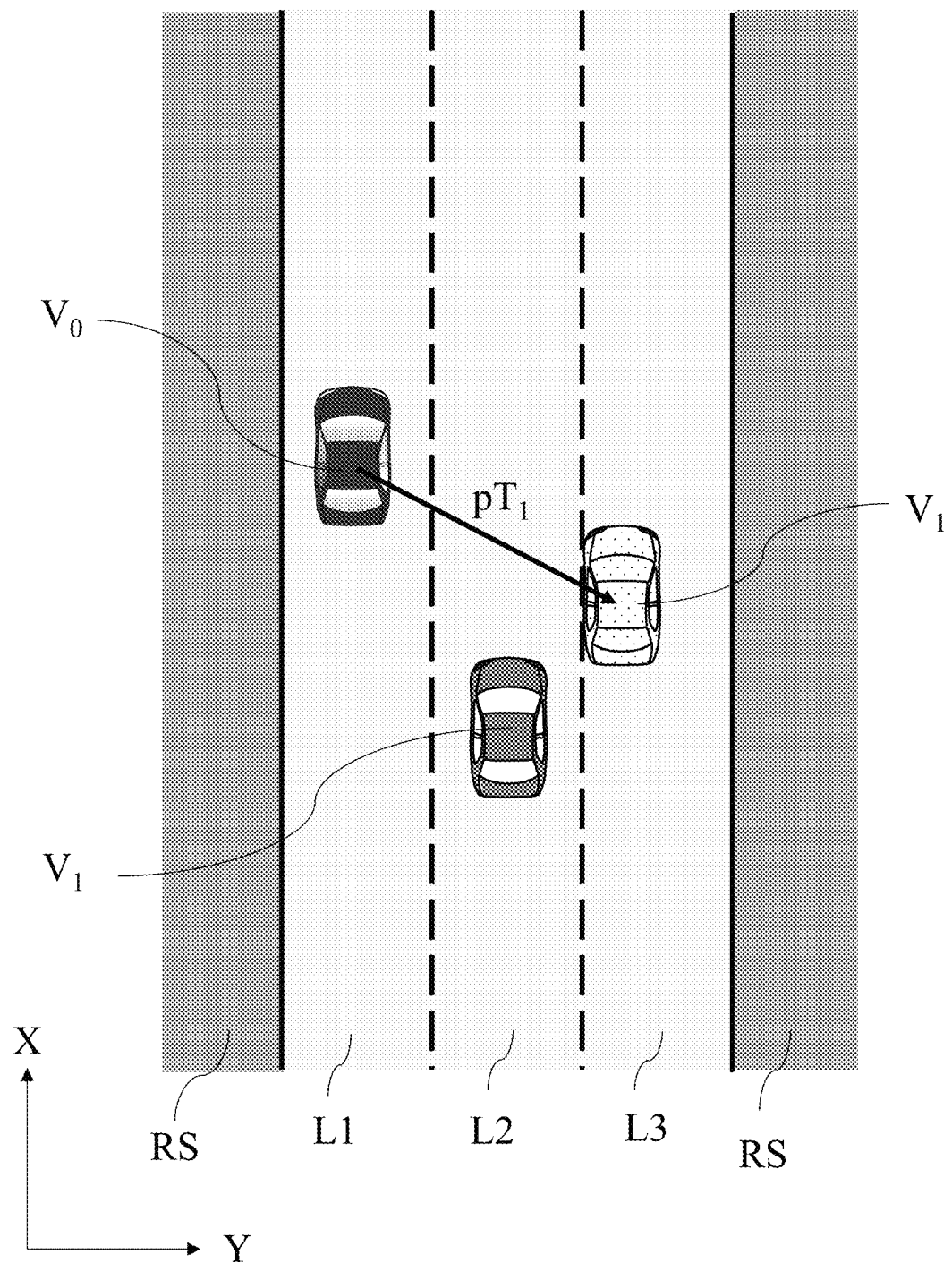
FIG. 9B is a plan view (part 2) for describing a method of estimating the position of another vehicle after a required time, wherein the method is executed by the travel control apparatus for a vehicle according to the embodiment of the present invention.

Then, the control device 19 uses the autonomous lane change control function to calculate a positional vector $pT_1$ after the required time T1 of the other vehicle $V_1$, as illustrated in FIG. 9B. Specifically, the control device 19 uses the autonomous lane change control function to calculate the positional vector $pT_1$ after the required time T1 of the other vehicle $V_1$ on the basis of the following equations (4) to (6).

$$pxT_1 = px_0 + vx_0 T_1 + 1/2(ax_0 T1)^2 \quad (4)$$

$$pyT_1 = py_0 + vy_0 T_1 + 1/2(ay_0 T1)^2 \quad (5)$$

$$pT_1 = pxT_1 i + pyT_1 j \quad (6)$$

In the above equations (4) and (5), $pxT_1$ represents a positional component in the X-axis direction of the positional vector $pT_1$ after the required time T1 of the other vehicle $V_1$, $pyT_1$ represents a positional component in the Y-axis direction of the positional vector $pT_1$ after the required time T1 of the other vehicle $V_1$, $vx_0 T_1$ represents a moving speed in the X-axis direction of the other vehicle $V_1$ after the required time T1, $vy_0 T_1$ represents a moving speed in the Y-axis direction of the other vehicle $V_1$ after the required time T1, $ax_0 T_1$ represents acceleration in the X-axis direction of the other vehicle $V_1$ after the required time T1, and $ay_0 T_1$ represents acceleration in the Y-axis direction of the other vehicle $V_1$ after the required time T1.

The control device 19 uses the autonomous lane change control function to estimate positions after the required time T1 of all other vehicles $V_1$ existing around the subject vehicle $V_0$. Then, the control device 19 uses the autonomous lane change control function to estimate an object range OS after the required time T1 on the basis of the positions after the required time T1 of the other vehicles $V_1$. The control device 19 uses the autonomous lane change control function to estimate an object range OS after the required time T1 by taking into account the situation of lane regulation after the required time T1, existence of obstacles on the road, presence or absence of obstruction in the adjacent lane L3, and existence of a section, such as a construction section, to which the subject vehicle cannot move. The control device 19 can use the autonomous lane change control function to estimate an object range OS after the required time T1 as in step S4.

In step S9, the control device 19 uses the autonomous lane change control function to acquire information on a required range RR. The required range RR refers to a range having a size necessary for the subject vehicle $V_0$ to change lanes, or a range having a size that is at least equal to or larger than a size which the subject vehicle $V_0$ occupies on the road surface. In one or more embodiments of the present invention, when a required range RR is set at the target position for changing lanes and the object range OS in the adjacent lane L3 includes the required range RR, a determination is made that a space corresponding to the required range RR exists within the object range OS in the adjacent lane L3, and changing lane to the adjacent lane L3 is permitted. In one or more embodiments of the present invention, the memory of the control device 19 stores information including the shape and size of a required range RR, and the autonomous lane change control function is used to acquire the information on the required range RR from the memory of the control device 19.

Figure 10A:
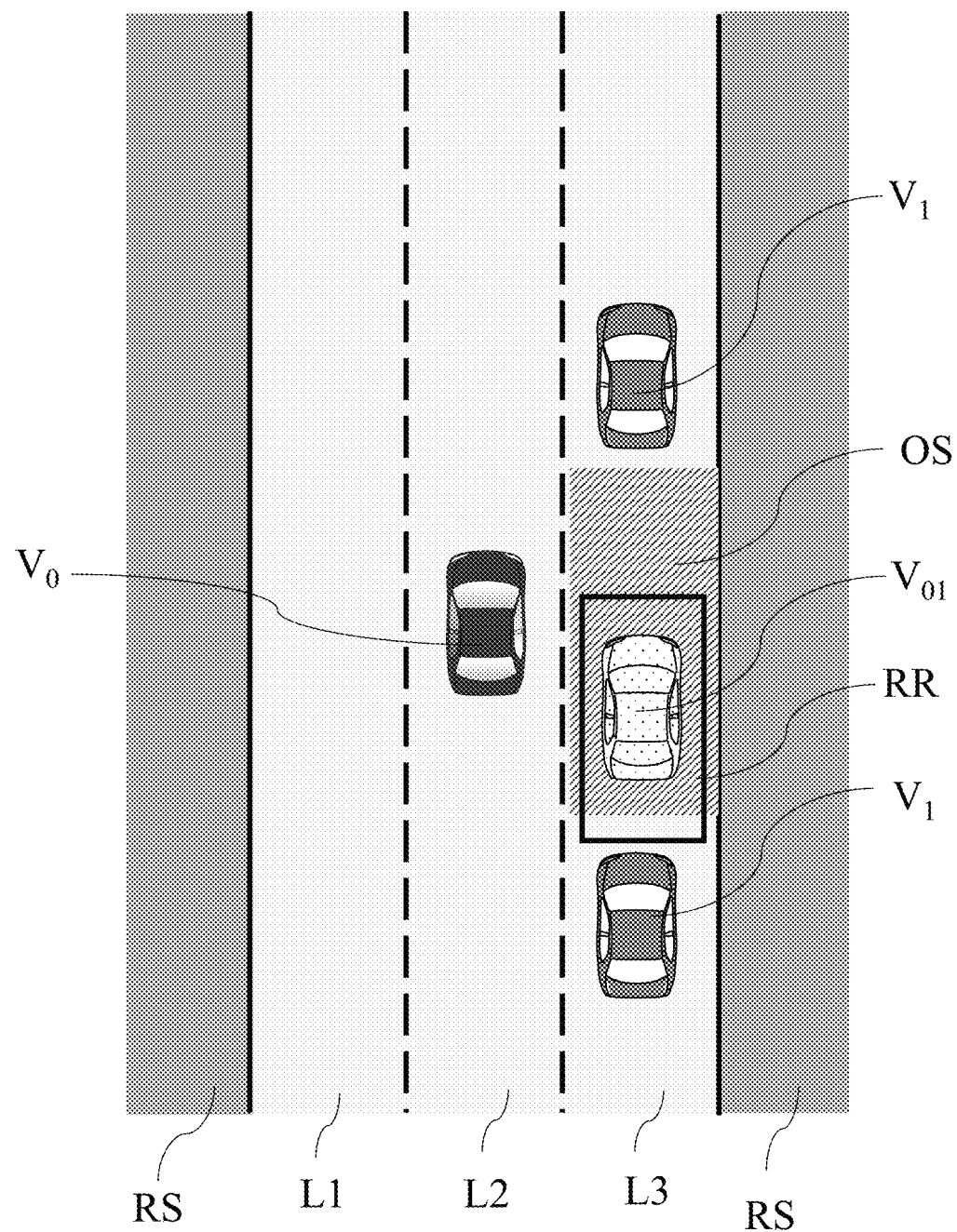
FIG. 10A is a plan view (part 1) for describing a method of determining whether or not changing lanes is possible, wherein the method is executed by the travel control apparatus for a vehicle according to the embodiment of the present invention.

In step S10, the control device 19 uses the autonomous lane change control function to determine whether or not there is a space within the object range OS in the adjacent lane L3 after the required time T1. The space corresponds to the required range RR acquired in step S9. The object range OS in the adjacent lane L3 after the required time T1 is estimated in step S8. Specifically, as illustrated in FIG. 10A, the control device 19 uses the autonomous lane change control function to set the required range RR at the target position for changing lanes (position of the subject vehicle $V_{0_1}$) which is set in step S5. Then, the control device 19 uses the autonomous lane change control function to determine whether or not the object range OS in the adjacent lane L3 after the required time T1 includes the required range RR.

Figure 10B:
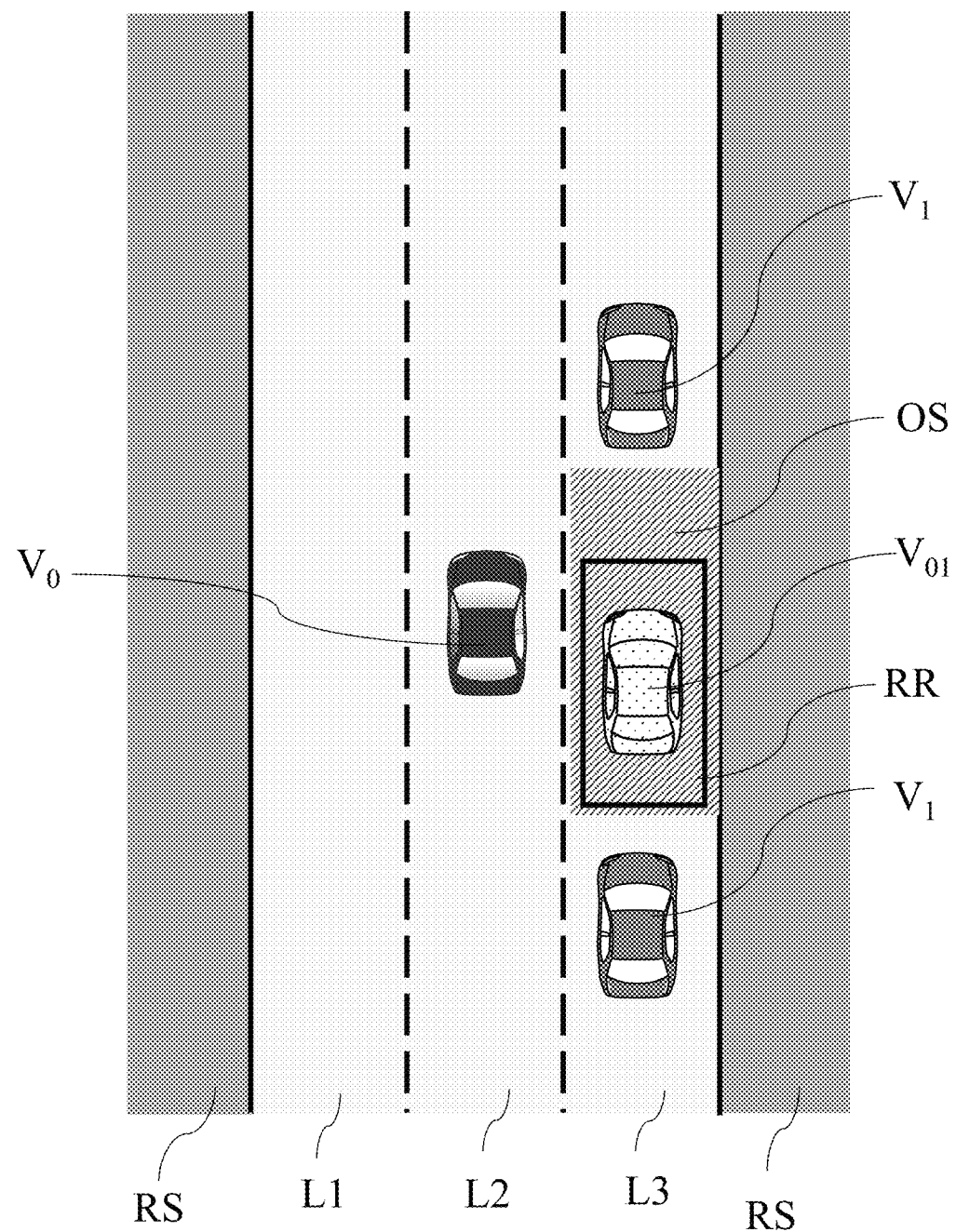
FIG. 10B is a plan view (part 2) for describing a method of determining whether or not changing lanes is possible, wherein the method is executed by the travel control apparatus for a vehicle according to the embodiment of the present invention.

For example, in the example illustrated in FIG. 10A, the object range OS in the adjacent lane L3 after the required time T1 does not include the rear portion of the required range RR. The control device 19 therefore uses the autonomous lane change control function to determine that there is not a space corresponding to the required range RR within the object range OS in the adjacent lane L3 after the required time T1. On the other hand, as illustrated in FIG. 10B, when the object range OS in the adjacent lane L3 after the required time T1 includes the required range RR, the control device 19 uses the autonomous lane change control function to determine that there is a space corresponding to the required range RR within the object range OS in the adjacent lane L3 after the required time T1. When there is a space corresponding to the required range RR within the object range OS in the adjacent lane L3 after the required time T1, the process proceeds to step S12 illustrated in FIG. 6B, while when there is no space, the process proceeds to step S11.

In step S1, a determination has been made that the object range OS in the adjacent lane L3 after the required time T1 does not include the required range RR and a space cannot be detected which corresponds to the required range RR within the object range OS in the adjacent lane L3 after the required time T1. In step S11, therefore, the control device 19 uses the autonomous lane change control function to change the target positions for lane changes. Specifically, the control device 19 uses the autonomous lane change control function to re-set the target positions for lane changes so that the object range OS in the adjacent lane L3 after the required time T1 includes the required range RR. For example, when the rear portion of the required range RR is not included in the object range OS in the adjacent lane L3 after the required time T1 as illustrated in FIG. 10A, the target positions for lane changes are shifted frontward. This allows the required range RR to be included in the object range OS in the adjacent lane L3 after the required time T1 as illustrated in FIG. 10B, and a determination is made that a space can be detected which corresponds to the required range RR within the object range OS in the adjacent lane L3 after the required time T1. Step S11 is followed by step S6, from which setting up the lateral speed, estimate of the required time T1, estimate of object ranges OS and the like are performed again.

Figure 6B:
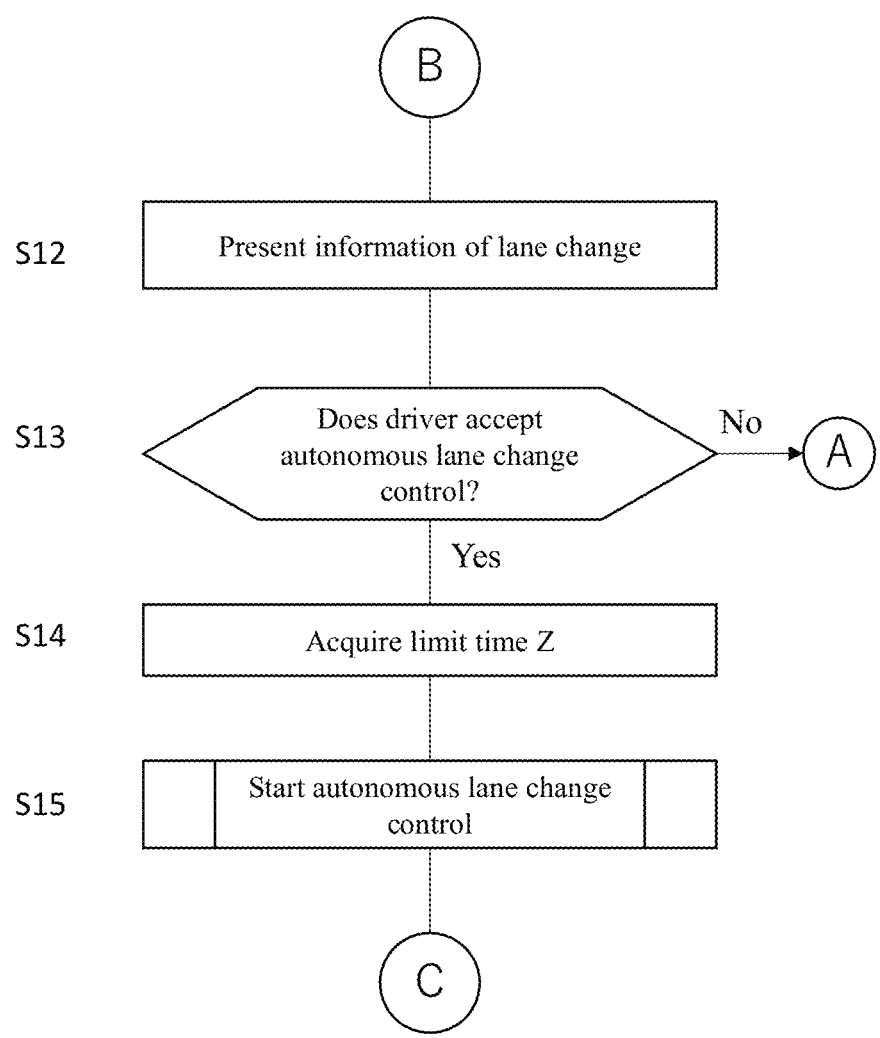
FIG. 6B is a flowchart (part 2) illustrating the lane change control process executed by the travel control apparatus for a vehicle according to the embodiment of the present invention.

On the other hand, when it is determined in step S10 of FIG. 6A that the object range OS in the adjacent lane L3 after the required time T1 includes the required range RR, the process proceeds to step S12 shown in FIG. 6B. In step S12 of FIG. 6B, the control device 19 uses the lane change information presentation function to present the lane change information to the driver via the display, the speaker, the warning light, the seat vibrator, etc. of the presentation device 15. In step S12, the control device 19 determines that the lane change from lane L2 to lane L3 can be executed in the processes of steps S1 to S10. Then, prior to actually executing the lane change, the control device 19 requests the driver to answer whether or not to accept the execution of the autonomous lane change control in order to prompt the driver himself/herself to confirm the safety.

Referring again to FIG. 6B, in step S13, the control device 19 uses the acceptance confirmation function to determine whether or not the driver has accepted the lane change from lane L2 to lane L3 in response to the acceptance request in step S12. That is, the driver visually checks the surrounding conditions, etc. according to the lane change information presented by the lane change information presentation function. When it is determined that the lane change may be allowed, the driver operates the dial switch or the touch panel of the input device 16, or the flasher of the onboard equipment 14, or inputs a voice to the microphone.

In step S14, the control device 19 uses the autonomous lane change control function to acquire the time limit Z of lane change. In this embodiment of the present invention, as shown in FIG. 2, the time until the subject vehicle approaches the point at which lane change is difficult in each travel scene is stored in the table as the time limit Z. The control device 19 uses the autonomous lane change control function to refer to the scene determination table shown in FIG. 2, and to acquire the time limit Z in the travel scene of the subject vehicle. For example, in the example "scene of catching up with a preceding vehicle" shown in FIG. 2, the time limit is stored as the "time to reach a preceding vehicle-α". In this case, the control device 19, uses the travel control function to refer to the scene determination table shown in FIG. 2, and to calculate the time to reach the preceding vehicle, and to acquire the calculated time to reach the preceding vehicle-α as the time limit Z. Note that, the α is a predetermined number of seconds, for example, 5 seconds, and can be appropriately set for each travel scene. For example, when the time to reach the preceding vehicle is 30 seconds and α is 5 seconds, then the time limit Z of lane change is 25 seconds.

In step S15, a start process for the autonomous lane change control is performed. In the start process for the autonomous lane change control, the control device 19 uses the autonomous lane change control function to set start timing L at which the autonomous lane change control is started. The method of setting the start timing L is not particularly limited, and the start timing L can be set, for example, with any of the following methods (1) to (8) described below. That is, (1) unique timing is set as the start timing L for the autonomous lane change control. For example, the timing after a predetermined time (e.g., 6 seconds) has elapsed from the driver's acceptance of the autonomous lane change control is set as the start timing L for the autonomous lane change control. (2) The start timing L for the autonomous lane change control is set based on the necessity level of changing lanes illustrated in FIG. 2. Specifically, the necessity level of changing lanes in the travel scene of the subject vehicle is acquired from the scene determination table illustrated in FIG. 2, and when the necessity level of changing lanes is not lower than a predetermined value, the start timing L for the autonomous lane change control is set to earlier timing than that in the case in which the necessity level of changing lanes is lower than the predetermined value. (3) The start timing L for the autonomous lane change control is set based on the time limit Z for changing lanes illustrated in FIG. 2. Specifically, the time limit Z for changing lanes in the travel scene of the subject vehicle is acquired from the scene determination table illustrated in FIG. 2, and when the time limit Z for changing lanes is less than a predetermined time $Z_{th}$, the start timing L for the autonomous lane change control is set to earlier timing than that in the case in which the time limit Z for changing lanes is not less than the predetermined time $Z_{th}$. (4) The start timing L for the autonomous lane change control is set based on the required time T1 for changing lanes. Specifically, when the required time T1 for changing lanes estimated in step S7 of FIG. 6A is less than a predetermined time $T_{th}$, the start timing L for the autonomous lane change control is set to earlier timing than that in the case in which the required time T1 for changing lanes is not less than the predetermined time $T_{th}$.

(5) The start timing L for the autonomous lane change control is set based on the time limit Z and required time T1 for changing lanes. Specifically, a margin time Y is obtained from the required time T1 for changing lanes and the time limit Z for changing lanes (e.g., Time limit Z−Required time T1=Margin time Y), and when the margin time Y is less than a predetermined time $Y_{th}$, the start timing L for the autonomous lane change control is set to earlier timing than that in the case in which the margin time Y is not less than the predetermined time $Y_{th}$. (6) The start timing L for the autonomous lane change control is set based on an attention level (commitment level) O that represents a degree as to how the driver is involved in the driving. For example, a determination is made whether the driver is making a conversation or hands-free call, by detecting the driver's voice using the input device 16 such as an onboard microphone or a hands-free device, and when the driver is making a conversation or hands-free call, the driver's attention level O is determined to be less than a threshold $O_{th}$, and the start timing L for the autonomous lane change control is set to later timing than that in the case in which the driver's attention level O is not less than the threshold $O_{th}$.

(7) The start timing L for the autonomous lane change control is set based on a traffic congestion level K. For example, the traffic congestion level K is determined based on the distance to a preceding vehicle, the distance to a following vehicle, the number of surrounding vehicles, the congestion level contained in the VICS (registered trademark) information, and/or the degree of deviation between the legal speed and the actual speed of the subject vehicle, and the traffic congestion level K is determined to be higher as the distance to a preceding vehicle is shorter, as the distance to a following vehicle is shorter, as the number of surrounding vehicles is larger, as the congestion level contained in the VICS information is higher, or as the degree of deviation between the legal speed and the actual speed of the subject vehicle is larger. When the traffic congestion level K is not lower than a predetermined value Kth, the start timing L for the autonomous lane change control is set to earlier timing than that in the case in which the traffic congestion level K is lower than the predetermined value Kth. (8) The start timing L for the autonomous lane change control is set based on a likelihood B of changing lanes. For example, a degree at which it can be assured that the subject vehicle changes lanes can be obtained as the likelihood B on the basis of the presence or absence of setting of a destination and/or the distance to a preceding vehicle. Specifically, when the destination is set and it is necessary to change lanes in order for the subject vehicle to reach the destination, a determination is made that the likelihood B of changing lanes is not lower than a threshold $B_{th}$. Additionally or alternatively, when the distance to a preceding vehicle is less than a predetermined distance, a determination is made that the driver desires to change lanes, and the likelihood B of changing lanes is determined to be not less than the threshold $B_{th}$. Then, when the likelihood B of changing lanes is not less than the threshold $B_{th}$, the start timing L for the autonomous lane change control is set to earlier timing than that in the case in which the likelihood B of changing lanes is less than the threshold $B_{th}$. Thus, the start timing L for the autonomous lane change control is set as above. The above-described (1) to (8) are examples of the method of setting the start timing L, and the method is not limited to the above. After setting the start timing L, the control device 19 may set, before starting the autonomous lane change control, preliminary notice presentation timing P for presenting the lane change information indicating that the autonomous lane change control will be started.

When the set start timing L is reached, the control device 19 uses the autonomous lane change control function to start the autonomous lane change control. Specifically, the control device 19 uses the autonomous lane change control function to allow the drive control device 18 to start control of the operation of the steering actuator so that the subject vehicle moves to the target positions for lane changes which are set in step S5 or step S11 of FIG. 6A. After the autonomous lane change control is started, the presentation device 15 may present the lane change information indicating that the autonomous lane change control is being executed.

The control device 19 uses the autonomous lane change control function to control the lateral speed upon the lane change. For example, in step S6 of FIG. 6A, when there is no following vehicle $V_2$ in the adjacent lane and the first lateral speed control shown in FIG. 1 is selected, the control device 19 uses the autonomous lane change control function to accelerate the lateral speed Vh of the subject vehicle $V_0$ within the subject vehicle lane L2 to the first target lateral speed Vh1. The control device 19 executes the lane change of the subject vehicle $V_0$ from the subject vehicle lane L2 to the adjacent lane L3 while maintaining the first target lateral speed Vh1, and decelerates the lateral speed Vh of the subject vehicle $V_0$ within the adjacent lane L3 from the first target lateral speed Vh1 to 0 (m/s).

When the following vehicle $V_2$ is detected in the adjacent lane and the second lateral speed control shown in FIGS. 3B to 3D is selected in S6 of FIG. 6A, the control device 19 uses the autonomous lane change control function to accelerate the lateral speed Vh (m/s) of the subject vehicle $V_0$ within the subject vehicle lane L2 to the calculated second target lateral speed Vh2. The control device 19 starts the deceleration of the lateral speed Vh at a timing P1 within the same subject vehicle lane L2, and executes the lane change of the subject vehicle $V_0$ from the subject vehicle lane L2 to the adjacent lane L3 while decelerating lateral speed Vh.

Figure 6C:
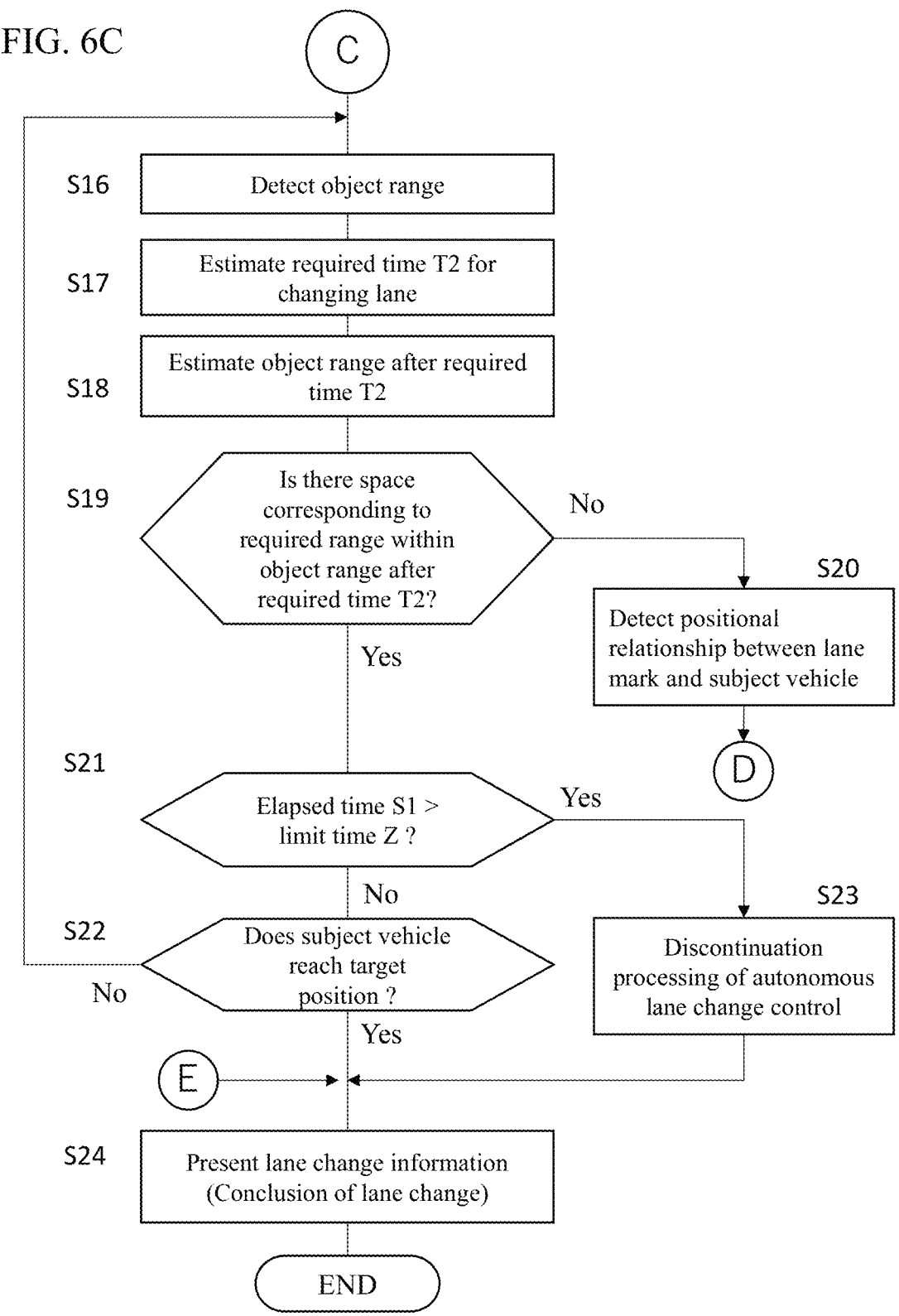
FIG. 6C is a flowchart (part 3) illustrating the lane change control process executed by the travel control apparatus for a vehicle according to the embodiment of the present invention.
Figure 6D:
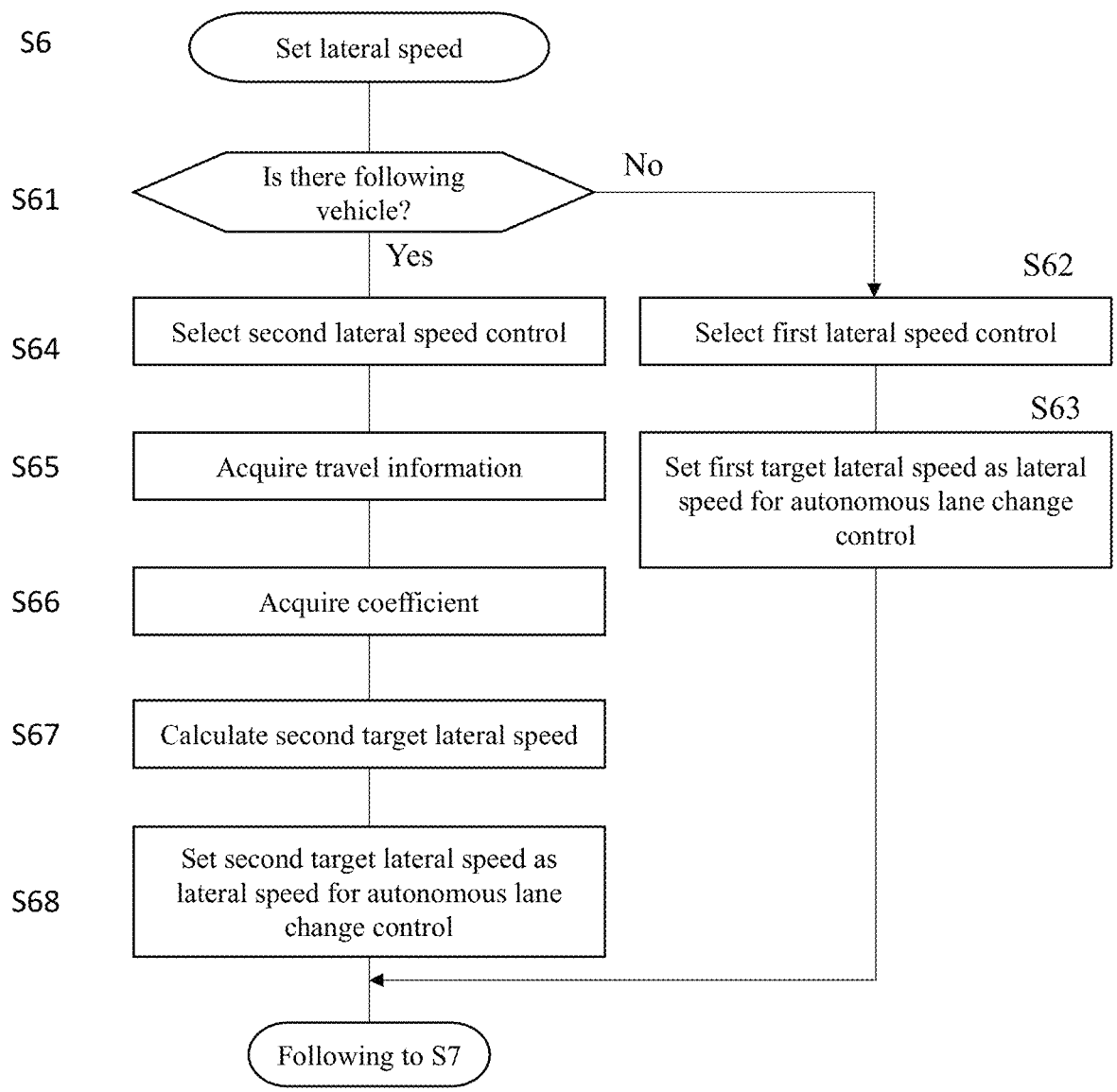
FIG. 6D is a flowchart (part 4) illustrating the lane change control process executed by the travel control apparatus for a vehicle according to the embodiment of the present invention.

In steps S16 to S18 of FIG. 6C, as the same in steps S4 and S7 to S8 of FIG. 6A, the current object range OS and the object range OS after the required time T2 at which the subject vehicle $V_0$ moves to the target position of the lane change (lane change from the lane L2 to the lane L3 in FIG. 8) are detected. In step S19, the control device 19 uses the autonomous lane change control function to determine again whether or not there is a space corresponding to the required range RR acquired in step S9 in the object range OS of the adjacent lane L3 after the required time T2 predicted in step S18. Then, the control device 19 uses the autonomous lane change control function to set the required range RR at the target position of the lane change, and when the object range OS of the adjacent lane L3 after the required time T2 includes the required range RR, it is determined that there is a space corresponding to the required range RR in the object range OS of the adjacent lane L3 after the required time T2, and the process proceeds to step S21. On the other hand, when the control device 19 determines that there is no space corresponding to the required range RR in the object range OS of the adjacent lane L3 after the required time T2, the process proceeds to step S20. The process of step S20 and the subsequent process will be described later referring to FIG. 6E.

In step S21, the control device 19 uses the autonomous lane change control function to determine whether or not the time limit Z acquired in step S14 has elapsed after starting the autonomous lane change control in step S15. When the elapsed time S1 after starting the autonomous lane change control exceeds the time limit Z, that is, when the target position of the lane change cannot be reached even if the time limit Z elapses after starting the autonomous lane change control, the process proceeds to step S23. In step S23, the control device 19 uses the autonomous lane change control function to perform the discontinuation processing of the autonomous lane change control. Specifically, the control device 19 uses the autonomous lane change control function to inform the driver that the autonomous lane change control is turned discontinuation. For example, after notifying the driver via the presentation device 15 that the lane change is to be interrupted due to a time-out, the autonomous lane change control is terminated. In the autonomous lane change control mode, the discontinuation processing may remain the subject vehicle at the current road width position, i.e., the position at the terminating of the autonomous lane change control or may recover the subject vehicle to the position at the starting of the autonomous lane change control. When recovering to the starting position of the autonomous lane change control, the driver may be notified of a message such as "Recover to the original position due to a time-out" for example.

On the other hand, in step S21, when the elapsed time S1 after starting the autonomous lane change control does not exceed the time limit Z, the process proceeds to step S22. In step S22, the control device 19 uses the autonomous lane change control function to determine whether or not the subject vehicle has reached the target position of the lane change. When the subject vehicle reaches the target position of lane change, the process proceeds to step S24. In step S24, since the autonomous lane change control by the autonomous lane change control function is completed, the lane change information indicating that lane change is completed is presented to the presentation device 15. When it is determined in step S22 that the subject vehicle has not reached the target position of the lane change, the process of the control device 19 returns to step S16 and continues the autonomous lane change control.

When the control device 19 determines that there is no space corresponding to the required range RR in the object range OS of the adjacent lane L3 after the required time T2 in step S19 of FIG. 6C, the process proceeds to step S20. That is, at the time of the step S10 of starting the autonomous lane change control, there is a space corresponding to the required range RR in the object range OS of the adjacent lane L3, but when there is no space corresponding to the required range RR in the object range OS of the adjacent lane L3 after starting the autonomous lane change control, the process proceeds to the step S20. In step S20, the positional relation between the object lane marks CL and the subject vehicle in road width direction is detected.

Figure 11A:
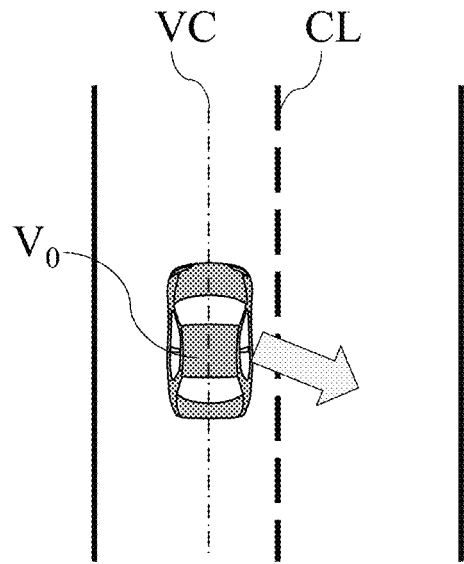
FIG. 11A-11D are a set of plan views for describing the positional relationship in the road width direction between object lane marks and the subject vehicle according to the embodiment of the present invention.
Figure 11B:
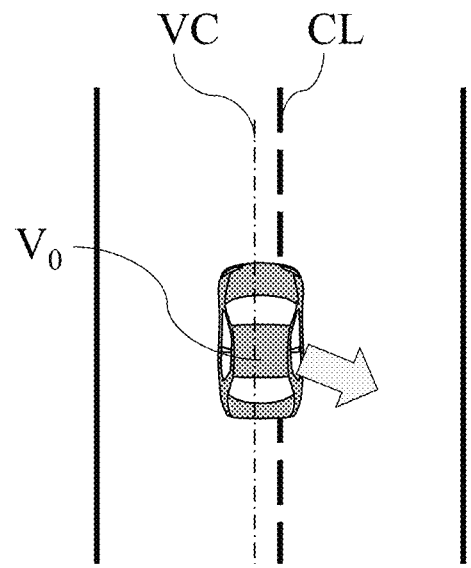
Figure 11C:
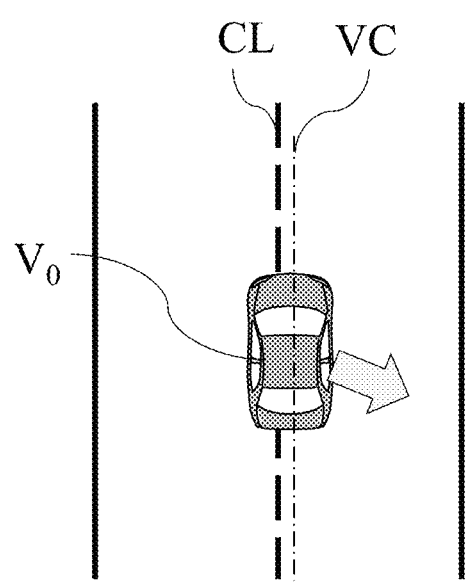
Figure 11D:
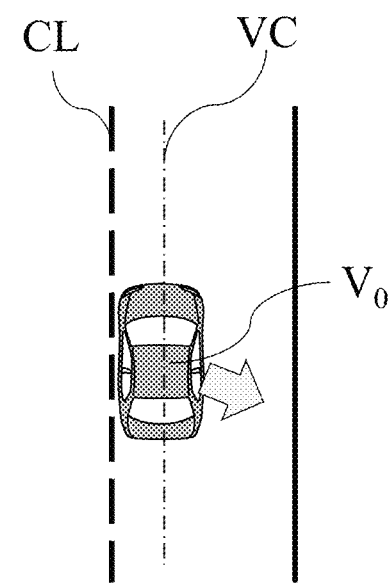

For example, FIGS. 11A to 11D exemplified scenes in which the subject vehicle $V_0$ changes lanes in the direction indicated by arrows in Figure (lane change from the left-side lane to the right-side lane in Figure). In this case, the control device 19 uses the autonomous lane change control function to determine any of a state in which no part of the subject vehicle $V_0$ gets across the object lane marks CL as illustrated in FIG. 11A, a state in which a part of the subject vehicle $V_0$ gets across the object lane marks CL but the center line VC of the subject vehicle $V_0$ does not get across the object lane marks CL as illustrated in FIG. 11B, a state in which the whole of the subject vehicle $V_0$ does not get across the object lane marks CL but the center line VC of the subject vehicle $V_0$ gets across the object lane marks CL as illustrated in FIG. 11C, and a state in which the whole of the subject vehicle $V_0$ gets across the object lane marks CL as illustrated in FIG. 11D.

Figure 6E:
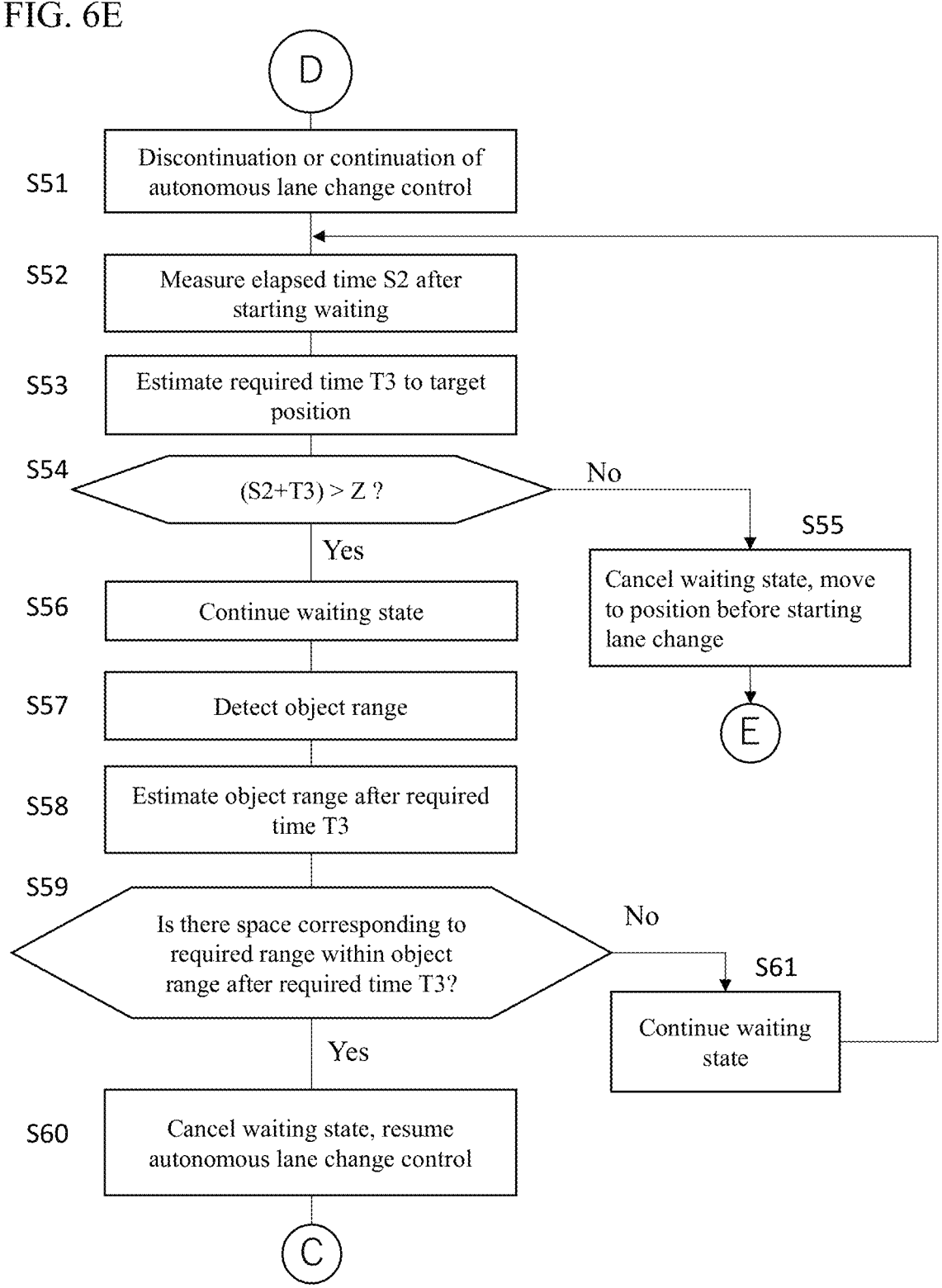
FIG. 6E is a flowchart (part 5) illustrating the lane change control process executed by the travel control apparatus for a vehicle according to the embodiment of the present invention.

In step S51 illustrated in FIG. 6E, the control device 19 uses the autonomous lane change control function to perform a control process for discontinuing or continuing the autonomous lane change control, on the basis of the positional relationship in the road width direction between the object lane marks CL and the subject vehicle $V_0$ determined in step S20 of FIG. 6C. Specifically, the control device 19 uses the autonomous lane change control function to determine (a) a method of presenting information to the driver when discontinuing or continuing the autonomous lane change control, (b) control after discontinuing or continuing the autonomous lane change control, and (c) a traveling position of the subject vehicle $V_0$ when discontinuing or continuing the autonomous lane change control, on the basis of the positional relationship in the road width direction between the object lane marks CL and the subject vehicle $V_0$.

For example, the control device 19 uses the autonomous lane change control function to carry out any of the following four methods as the method (a) of presenting information to the driver when discontinuing or continuing the autonomous lane change control: (a1) a method that includes presenting information for allowing the driver to select between options of discontinuing and continuing the autonomous lane change control without time limit and, when the driver selects any of the options, executing control of the option (discontinuing or continuing the autonomous lane change control) selected by the driver; (a2) a method that includes presenting information for allowing the driver to select between options of discontinuing and continuing lane change with time limit and, when the driver selects any of the options within the time limit, executing control of the option (discontinuing or continuing the autonomous lane change control) selected by the driver or, when the driver does not select between the options within the time limit, executing control (default control) of a predetermined option among the options of discontinuing and continuing the autonomous lane change control; (a3) a method that includes autonomously executing discontinuation or continuation of the autonomous lane change control and expressly providing the driver with a method of canceling the discontinuation or continuation of lane changes which is autonomously executed; and (a4) a method that includes autonomously executing discontinuation or continuation of the autonomous lane change control without expressly providing the driver with a method of canceling the discontinuation or continuation of lane changes which is autonomously executed.

Additionally or alternatively, the control device 19 uses the autonomous lane change control function to carry out any of the following three control schemes as the control content (b) after discontinuing or continuing the autonomous lane change control: (b1) a scheme that includes discontinuing the autonomous lane change control and also discontinuing the autonomous travel control; (b2) a scheme that includes discontinuing only the autonomous lane change control and continuing the autonomous travel control; and (b3) a scheme that includes suspending the autonomous lane change control into a waiting state until a space corresponding to the required range RR is detected again within the object range OS in the adjacent lane L3 and resuming the autonomous lane change control when a space corresponding to the required range RR is detected again within the object range OS in the adjacent lane L3.

Additionally or alternatively, the control device 19 uses the autonomous lane change control function to carry out any of the following three positional adjustment schemes for the traveling position (c) of the subject vehicle when discontinuing or continuing the autonomous lane change control: (c1) a scheme that includes recovering the position of the subject vehicle to the original position before starting the autonomous lane change control; (c2) a scheme that includes moving the subject vehicle to a position in the vicinity of the object lane marks CL in the lane in which the subject vehicle traveled before starting the autonomous lane change control; and (c3) a scheme that includes maintaining the current position.

The control device 19 uses the autonomous lane change control function to perform the control process for discontinuing or continuing the autonomous lane change control by appropriately combining two or more of the method (a) of presenting information to the driver when discontinuing or continuing the autonomous lane change control, the control content (b) after discontinuing or continuing the autonomous lane change control, and the traveling position (c) of the subject vehicle when discontinuing or continuing the autonomous lane change control, on the basis of the positional relationship in the road width direction between the object lane marks CL and the subject vehicle $V_O$.

For example, when no part of the subject vehicle $V_O$ gets across the object lane marks CL as illustrated in FIG. 11A, the control device 19 can carry out the method ($a_4$) that includes autonomously executing discontinuation of the autonomous lane change control without expressly providing the driver with a method of canceling the discontinuation of the autonomous lane change control. In this case, the control device 19 can use the autonomous lane change control function to carry out the scheme (b1) that includes discontinuing the autonomous lane change control and also discontinuing the autonomous travel control and the scheme (c1) that includes recovering the position of the subject vehicle to the original position before starting the autonomous lane change control. In such a case, the control device 19 can announce the control content to be performed from that time for discontinuing the autonomous lane change control to the driver, such as "Position will be recovered to the original position because the space for changing lanes may be insufficient" and "Autonomous travel control will be canceled after recovery to the original position." In this case, the process proceeds to step S24 of FIG. 6C to conclude the autonomous lane change control.

When a part of the subject vehicle $V_O$ gets across the object lane marks CL but the center line VC of the subject vehicle $V_O$ does not get across the object lane marks CL as illustrated in FIG. 11B, the control device 19 can carry out the method ($a_3$) that includes autonomously executing discontinuation of the autonomous lane change control and expressly providing the driver with a method of canceling the discontinuation of the autonomous lane change control. In this case, the control device 19 can use the autonomous lane change control function to carry out the scheme (c2) that includes moving the subject vehicle $V_O$ to a position in the vicinity of the object lane marks CL in the lane in which the subject vehicle traveled before starting the autonomous lane change control and then carry out the scheme (b2) that includes discontinuing only the autonomous lane change control and continuing the autonomous travel control. In such a case, the control device 19 can announce the control content to be performed from that time for discontinuing the autonomous lane change control to the driver, such as "Position will be recovered into the original lane because the space for changing lanes may be insufficient" and "Previous autonomous travel control will be continued after recovery to the original position." Additionally or alternatively, the control device 19 can display a message "Please press the button below if lane changes should be continued" together with a button for continuing the autonomous lane change control. When the driver presses the button for continuing the autonomous lane change control, the process proceeds to step S52 of FIG. 6E, while when the driver does not press the button for continuing the autonomous lane change control, the process proceeds to step S24 of FIG. 6C.

When the whole of the subject vehicle $V_O$ does not get across the object lane marks CL but the center line VC of the subject vehicle $V_O$ gets across the object lane marks CL as illustrated in FIG. 11C, the control device 19 can carry out the method ($a_4$) that includes autonomously executing continuation of the autonomous lane change control without expressly providing the driver with a method of canceling the continuation of the autonomous lane change control. In this case, the control device 19 can carry out the scheme (c3)

that includes waiting while maintaining the traveling position of the subject vehicle at the current position and the scheme (b3) that includes suspending the autonomous lane change control until a space corresponding to the required range RR is detected again within the object range OS in the adjacent lane L3 and resuming the autonomous lane change control when a space corresponding to the required range RR is detected again within the object range OS in the adjacent lane L3. In this case, for example, the control device 19 can announce the control content to be performed from that time for continuing the autonomous lane change control to the driver, such as "Waiting will be conducted at the current position because the space for changing lanes may be insufficient" and "Autonomous lane change control will be resumed if a space for changing lanes is found." In this case, the process proceeds to step S52 of FIG. 6E.

When the whole of the subject vehicle $V_0$ gets across the object lane marks CL as illustrated in FIG. 11D, the control device 19 can carry out the method (a4) that includes autonomously executing discontinuation of the autonomous lane change control without expressly providing the driver with a method of canceling the discontinuation of the autonomous lane change control. In this case, the control device 19 can carry out the scheme (c3) that includes maintaining the traveling position of the subject vehicle at the current position and the scheme (b2) that includes discontinuing only the autonomous lane change control and continuing the autonomous travel control. In this case, the control device 19 can announce the control content to be performed from that time for discontinuing the autonomous lane change control to the driver, such as "Waiting will be conducted at the current position because the space for changing lanes may be insufficient" and "Previous autonomous travel control will be continued." In this case, the process proceeds to step S24 of FIG. 6C to conclude the travel control process.

The positional relationship in the road width direction between the object lane marks CL and the subject vehicle $V_0$ is not limited to the four scenes illustrated in FIGS. 11A to 11D and five or more or three or less possible scenes may be employed. The combination of control schemes for each positional relationship is not limited to the above-described combinations. Any combination is possible among two or more of the method (a) of presenting information to the driver when discontinuing or continuing the autonomous lane change control, the control content (b) after discontinuing or continuing the autonomous lane change control, and the traveling position (c) of the subject vehicle when discontinuing or continuing the autonomous lane change control.

Description will then be made for a case in which continuation of the autonomous lane change control is executed in step S51 of FIG. 6E. Step S51 of starting the continuation of the autonomous lane change control is followed by step S52. In step S52, the control device 19 uses the autonomous lane change control function to measure an elapsed time S2 after the autonomous lane change control comes to a waiting state in step S51. That is, in one or more embodiments of the present invention, when the autonomous lane change control is continued in step S51, the autonomous lane change control is suspended and comes to a waiting state until a space corresponding to the required range RR is detected again in the object range OS in the adjacent lane L3. In step S52, the elapsed time S2 after starting the waiting of the autonomous lane change control in this manner is measured.

In step S53, the control device 19 uses the autonomous lane change control function to estimate a required time T3 for the subject vehicle to move from the current position to the target position for changing lanes. The required time T3 can be estimated in the same method as in step S7 of FIG. 6A.

In step S54, the control device 19 uses the autonomous lane change control function to determine whether or not the total time (S2+T3) of the elapsed time S2 measured in step S52 and the required time T3 estimated in step S53 exceeds the time limit Z acquired in step S14 of FIG. 6B. When the total time (S2+T3) exceeds the time limit Z, the process proceeds to step S55, in which the control device 19 uses the autonomous lane change control function to cancel the waiting state of the autonomous lane change control and move the subject vehicle to the traveling position of the subject vehicle before start of the autonomous lane change control. Step S55 is followed by step S24 of FIG. 6C, in which the autonomous lane change control is concluded. On the other hand, when the total time (S2+T3) does not exceed the time limit Z, the process proceeds to step S56.

In step S56, the control device 19 continues the waiting state of the autonomous lane change control. Step S56 is followed by steps S57 to S58, in which the current object range and the object range after the required time T3 are detected as in steps S4 and S8 of FIG. 6A. Then, in step S59, as in step S10 of FIG. 6A, the control device 19 determines whether or not there is a space corresponding to the required range RR within the object range OS in the adjacent lane L3 after the required time T3. The object range OS in the adjacent lane L3 after the required time T3 is estimated in step S58. In step S59, the control device 19 sets the required range RR at the target position for changing lanes. When the object range OS in the adjacent lane L3 after the required time T3 includes the required range RR, the control device 19 determines that there is a space corresponding to the required range RR within the object range OS in the adjacent lane L3 after the required time T3, and the process proceeds to step S60. In step S60, the control device 19 uses the autonomous lane change control function to cancel the waiting state of the autonomous lane change control and resume the autonomous lane change control because a space corresponding to the required range RR is detected within the object range OS in the adjacent lane L3. The process in this case returns to step S16 of FIG. 6C. On the other hand, when a determination is made in step S59 that there is not a space corresponding to the required range RR within the object range OS in the adjacent lane L3 after the required time T3, the process proceeds to step S61, in which the waiting state of the autonomous lane change control is continued, and the process returns to step S52.

By executing the above processes, the autonomous lane change control from the subject vehicle lane L2 to the adjacent lane L3 in FIG. 7 is completed.

As described above, according to the travel control apparatus 1 for a vehicle and the travel control method for a vehicle of the present embodiments, when the autonomous lane change control is executed from the subject vehicle lane L2 in which the subject vehicle $V_0$ travels to the adjacent lane L3, the autonomous lane change control is performed such that lateral speed is accelerated within the subject vehicle lane L2 and then the lateral speed is decelerated within the subject vehicle lane L2. By performing the lane change after the lateral speed is decelerated, the lane change lateral speed when the subject vehicle $V_0$ crosses the object lane marks CL which is the boundary between the subject vehicle lane L2 and the adjacent lane L3 becomes lower than a lateral speed when the lane change is performed without decelerating the lateral speed. This increases the amount of time that the driver of the following vehicle $V_2$ confirms for the lane change of the subject vehicle $V_0$ to make it easier to recognize the lane changes. Since the subject vehicle $V_0$ performs the autonomous lane change control more slowly than a vehicle when the autonomous lane change control is performed without decelerating the lateral speed, the situation of the adjacent lane L3 can be detected in detail by the cameras and radars of sensors 11. This further increases the safety of the autonomous lane change control.

Further, according to the travel control apparatus 1 for a vehicle and the travel control method for a vehicle of the present embodiments, the following vehicle $V_2$ traveling behind the subject vehicle $V_0$ is detected in the adjacent lane L3 before starting the autonomous lane change control, and when the following vehicle $V_2$ is detected, the lateral speed is accelerated within the subject vehicle lane L2 and then the lateral speed is decelerated to perform the autonomous lane change control. In other words, when the following vehicle $V_2$ exists in the adjacent lane L3, the autonomous lane change control is performed so that the lane change of the subject vehicle $V_0$ preceding the following vehicle $V_2$ can be easily confirmed, and when the following vehicle $V_2$ does not exist in the adjacent lane L3, unnecessary lateral speed control is not performed. Therefore, it is possible to achieve both a further improvement in safety during the autonomous lane change control and a reduction in the control load of the travel control apparatus 1.

Further, according to the travel control apparatus 1 for a vehicle and the travel control method for a vehicle of the present embodiments, the travel information relating to the traveling condition of the subject vehicle $V_0$ is acquired, and the lane change lateral speed which is a lateral speed when the subject vehicle $V_0$ crosses the object lane marks CL which is the boundary between the subject vehicle lane L2 and the adjacent lane L3 is changed on the basis of the acquired travel information. That is, when it is determined that it is difficult for the following vehicle $V_2$ to confirm the lane change in the current traveling condition on the basis of the traveling information, the lane change lateral speed is changed. Since this allows the subject vehicle $V_0$ to execute the autonomous lane change control slowly, it makes longer for the driver of the following vehicle $V_2$ to confirm the lane change, it makes easier to recognize the lane change. Therefore, the safety of the autonomous lane change control is further enhanced.

Further, according to the travel control apparatus 1 for a vehicle and the travel control method for a vehicle of the present embodiments, the lane change lateral speed is changed by changing the target lateral speed at the time of accelerating the lateral speed of the subject vehicle $V_0$ in the subject vehicle lane L2. That is, the lane change lateral speed is controlled indirectly by controlling the target lateral speed without controlling the lane change lateral speed directly. Therefore, since the control is easier than control when directly controlling the lane change lateral speed which is a lateral speed in the autonomous lane change control, it is possible to reduce the control load of the travel control apparatus 1.

Further, according to the travel control apparatus 1 for a vehicle and the travel control method for a vehicle of the present embodiments, the lane change lateral speed is changed by changing the timing at which the deceleration of the lateral speed of the subject vehicle $V_0$ is started in the subject vehicle lane L2. That is, the lane change lateral speed is indirectly controlled by controlling the starting timing of decelerating the lateral speed without controlling the lane change lateral speed directly. Therefore, since the control is easier than control when directly controlling the lane change lateral speed which is a lateral speed in the autonomous lane change control, it is possible to reduce the control load of the travel control apparatus 1.

In addition, according to the travel control apparatus 1 for a vehicle and the travel control method for a vehicle of the present embodiments, the inter-vehicle distance D between the subject vehicle $V_0$ and the following vehicle $V_2$ traveling the adjacent lane L3 is acquired as the travel information, and the shorter the acquired inter-vehicle distance D is, the lower the lane change lateral speed is. That is, the shorter the inter-vehicle distance D is, the closer the lane change is executed near the following vehicle $V_2$. However, since the shorter the inter-vehicle distance D is, the slower the lane changes of the subject vehicle $V_0$ are executed, it makes easier for the following vehicle $V_2$ to confirm the lane change of the subject vehicle $V_0$. Therefore, the safety of the autonomous lane change control is further enhanced.

Further, according to the travel control apparatus 1 for a vehicle and the travel control method for a vehicle of the present embodiments, the relative speed Vd of the following vehicle $V_2$ for the subject vehicle $V_0$ is detected as the travel information, the higher the relative speed Vd is, and the lower the lane change lateral speed is. That is, the higher the relative speed Vd is, the shorter the following vehicle $V_2$ approaches the subject vehicle $V_0$, and the closer lane change will be performed to the following vehicle $V_2$. However, since the higher the relative speed Vd is, the slower the autonomous lane change control of the subject vehicle $V_0$ is executed, the time that the driver of the following vehicle $V_2$ can confirm the lane change of the subject vehicle $V_0$ increases, and the lane changes becomes easier to recognize. Therefore, the safety of the autonomous lane change control is further enhanced.

Further, according to the travel control apparatus 1 for a vehicle and the travel control method for a vehicle of the present embodiments, the road width Lw of the adjacent lane L3 is acquired as the travel information, and the narrower the road width Lw is, the lower the lane change lateral speed. That is, the narrower the road width Lw of the adjacent lane L3 is, the lane change of the subject vehicle $V_0$ is completed in a shorter time. But the narrower the road width Lw of the adjacent lane L3 is, the autonomous lane change control of the subject vehicle $V_0$ is performed more slowly. Therefore, the time for the driver of the following vehicle $V_2$ to confirm the lane change of the subject vehicle $V_0$ becomes longer, and the lane change becomes easier to recognize. Therefore, the safety of the autonomous lane change control is further enhanced.

Further, according to the travel control apparatus 1 for a vehicle and the travel control method for a vehicle of the present embodiments, the radius Lr of the adjacent lane L3 is acquired as the travel information, and the shorter the radius Lr of the adjacent lane L3 is, the lower the lane change lateral speed is. That is, the shorter the radius Lr of the adjacent lane L3 is, the more difficult it is to confirm the preceding subject vehicle $V_0$ from the following vehicle $V_2$. But the shorter the radius Lr of the adjacent lane L3 is, the slower the autonomous lane change control of the subject vehicle $V_0$ is executed, the longer time the driver of the following vehicle $V_2$ confirms the lane change of the subject vehicle $V_0$. Therefore, it becomes easy to recognize the lane change, and the safety of the autonomous lane change control is further enhanced.

Further, according to the travel control apparatus 1 for a vehicle and the travel control method for a vehicle of the present embodiments, the information on the amount of rainfall is acquired as the travel information, and the more amount of rainfall is, the lower the lane change lateral speed is. That is, the more amount of rainfall is, the less visible the preceding subject vehicle $V_0$ from the following vehicle $V_2$ is. But the more amount of rainfall is, the slower the autonomous lane change control of the subject vehicle $V_0$ is. The longer the driver of the following vehicle $V_2$ confirms the lane change of the subject vehicle $V_0$ is, the easier it makes to recognize the lane change. Therefore, the safety of the autonomous lane change control is further enhanced.

In the above embodiments, it has been described that as means of changing the lane change speed, one means for changing the target lateral speed at the time of accelerating the lateral speed of the subject vehicle $V_0$ within the subject vehicle lane L2 and another means for changing the timing of starting the deceleration of the lateral speed of the subject vehicle $V_0$ in the subject vehicle lane L2. These two means, however, may be combined to change the lane change speed. The change range of the lane change speed can be widened by changing the combination of the target lateral speed and the timing at which the lateral speed starts decelerating. In addition, although the inter-vehicle distance D, the relative speed Vd, the road width Lw of the adjacent lane, the radius Lr of the adjacent lane and the amount of rainfall are used as the travel information, the distance in the road width direction between the subject vehicle $V_0$ and following vehicle $V_2$ may be added as another travel information.

DESCRIPTION OF REFERENCE NUMERALS

1 Travel control apparatus
11 Sensors
12 Subject vehicle position detection device
13 Map database
14 Onboard equipment
14 Presentation device
16 Input device
17 Communication device
18 Drive control device
19 Control device
$V_0$ Subject vehicle
$V_1$ Another vehicle
$V_2$ Following vehicle
L1, L2, L3 Lane
RS Road shoulder
OS Object range
RR Required range
RA Range in which subject vehicle cannot travel
RL Lane change prohibition mark
CL Object lane mark
VC Center line of subject vehicle
Vh1 First target lateral speed
Vh2 Second target lateral speed
Vhc1, Vhc2, Vhc3 lane change lateral speed
P1, P2 Decreasing timing of lateral speed

The invention claimed is:

1. A travel control method for a vehicle for executing autonomous lane change control which operates a steering actuator so as to autonomously control a subject vehicle to change a lane from a subject vehicle lane in which the subject vehicle travels to an adjacent lane, the travel control method comprising:
upon execution of the autonomous lane change control, increasing a lateral speed of the subject vehicle within the subject vehicle lane; and thereafter
decreasing the lateral speed of the subject vehicle within the subject vehicle lane to execute the autonomous lane change control.

2. The travel control method according to claim 1, comprising:
detecting a following vehicle traveling in the adjacent lane behind the subject vehicle before the execution of the autonomous lane change control;
when detecting the following vehicle, after increasing the lateral speed of the subject vehicle within the subject vehicle lane, decreasing the lateral speed of the subject vehicle to execute the autonomous lane change control.

3. The travel control method according to claim 1, comprising:
acquiring travel information regarding a traveling state of the subject vehicle; and
setting a lane change lateral speed on a basis of the travel information, the lane change lateral speed being a lateral speed upon the subject vehicle crossing a boundary line between the subject vehicle lane and the adjacent lane.

4. The travel control method according to claim 3, wherein the lane change lateral speed is set by changing a target lateral speed upon increasing the lateral speed of the subject vehicle within the subject vehicle lane.

5. The travel control method according to claim 3, wherein the lane change lateral speed is set by changing a start timing of decreasing the lateral speed of the subject vehicle within the subject vehicle lane.

6. The travel control method according to claim 3, comprising:
acquiring an inter-vehicle distance between the subject vehicle and the following vehicle traveling in the adjacent lane as the travel information; and
setting the lane change lateral speed lower as an acquired inter-vehicle distance becomes shorter.

7. The travel control method according to claim 3, comprising:
detecting a relative speed of the following vehicle traveling in the adjacent lane with respect to the subject vehicle as the travel information; and
setting the lane change lateral speed lower as the relative speed becomes higher.

8. The travel control method according to claim 3, comprising:
acquiring a road width of the adjacent lane as the travel information; and
setting the lane change lateral speed lower as the road width becomes narrower.

9. The travel control method according to claim 3, comprising:
acquiring a road radius of the adjacent lane as the travel information; and
setting the lane change lateral speed lower as the road radius becomes shorter.

10. The travel control method according to claim 3, comprising:
acquiring information regarding an amount of rainfall as the travel information; and
setting the lane change lateral speed lower as the amount of rainfall becomes larger.

11. A travel control apparatus for a vehicle for executing autonomous lane change control which operates a steering actuator so as to autonomously control a subject vehicle to change a lane from a subject vehicle lane in which the subject vehicle travels to an adjacent lane, the travel control apparatus configured to:

upon execution of the autonomous lane change control, increase a lateral speed of the subject vehicle within the subject vehicle lane; and thereafter decrease the lateral speed of the subject vehicle within the subject vehicle lane to execute the autonomous lane change control.

\* \* \* \* \*